United States Patent
Zhang et al.

(10) Patent No.: US 11,140,749 B2
(45) Date of Patent: Oct. 5, 2021

(54) USER EQUIPMENT (UE), GENERATION NODE-B (GNB) AND METHODS FOR SIGNALING OF CONTROL INFORMATION FOR PRE-CODING

(71) Applicant: Apple Inc., Cupertino, CA (US)

(72) Inventors: Yushu Zhang, Beijing (CN); Alexei Davydov, Nizhny Novgorod (RU); Wook Bong Lee, San Jose, CA (US); Dae Won Lee, Portland, OR (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 16/349,556

(22) PCT Filed: Dec. 12, 2017

(86) PCT No.: PCT/US2017/065710
§ 371 (c)(1),
(2) Date: May 13, 2019

(87) PCT Pub. No.: WO2018/111809
PCT Pub. Date: Jun. 21, 2018

(65) Prior Publication Data
US 2020/0196388 A1    Jun. 18, 2020

Related U.S. Application Data

(63) Continuation of application No. PCT/CN2016/109647, filed on Dec. 13, 2016.

(51) Int. Cl.
*H04W 88/06*    (2009.01)
*H04B 7/024*    (2017.01)
(Continued)

(52) U.S. Cl.
CPC ........... *H04W 88/06* (2013.01); *H04B 7/024* (2013.01); *H04B 7/0417* (2013.01);
(Continued)

(58) Field of Classification Search
None
See application file for complete search history.

(56) References Cited

U.S. PATENT DOCUMENTS

2011/0310986 A1    12/2011   Heo et al.
2012/0020288 A1    1/2012    Liu et al.
(Continued)

FOREIGN PATENT DOCUMENTS

WO    WO-2015194849 A1    12/2015
WO    WO-2016183737 A1    11/2016

OTHER PUBLICATIONS

"International Application Serial No. PCT/US2017/065710, International Search Report dated Mar. 29, 2018", 3 pgs.
(Continued)

*Primary Examiner* — Adnan Baig
(74) *Attorney, Agent, or Firm* — Kowert, Hood, Munyon, Rankin & Goetzel, P.C.

(57)    ABSTRACT

Embodiments of a User Equipment (UE), a generation Node-B (gNB) and methods for communication are generally described herein. The UE may the UE 102 may receive from a gNB, control signaling that indicates: a first pre-coding matrix indicator (PMI) that indicates a first pre-coder for a first sub-band; and a second PMI that indicates a second pre-coder for a second sub-band. The first and second pre-coders may be included in predetermined candidate pre-coders. The UE may encode a physical uplink shared channel (PUSCH) block for transmission. The UE may scale the PUSCH block in the first sub-band by the first (Continued)

pre-coder. The UE may scale the PUSCH block in the second sub-band by the second pre-coder.

22 Claims, 12 Drawing Sheets

(51) Int. Cl.
  *H04B 7/0417* (2017.01)
  *H04B 7/0456* (2017.01)
  *H04B 7/06* (2006.01)
  *H04L 5/00* (2006.01)

(52) U.S. Cl.
  CPC ......... *H04B 7/0456* (2013.01); *H04B 7/0626* (2013.01); *H04B 7/0639* (2013.01); *H04L 5/0051* (2013.01)

(56) References Cited

U.S. PATENT DOCUMENTS

| | | | |
|---|---|---|---|
| 2015/0049698 A1 | 2/2015 | Liu et al. | |
| 2015/0256308 A1* | 9/2015 | Ma | H04B 7/2615 |
| | | | 370/330 |
| 2015/0326287 A1* | 11/2015 | Kazmi | H04W 52/281 |
| | | | 375/267 |
| 2017/0134082 A1* | 5/2017 | Onggosanusi | H04B 7/0469 |
| 2017/0201308 A1* | 7/2017 | Park | H04B 7/0417 |
| 2018/0084448 A1* | 3/2018 | Yang | H04W 16/32 |
| 2018/0241530 A1* | 8/2018 | Takeda | H04W 72/1294 |

OTHER PUBLICATIONS

"International Application Serial No. PCT/US2017/065710, Written Opinion dated Mar. 29, 2018", 6 pgs.

* cited by examiner

US 11,140,749 B2

USER EQUIPMENT (UE), GENERATION NODE-B (GNB) AND METHODS FOR SIGNALING OF CONTROL INFORMATION FOR PRE-CODING

PRIORITY CLAIM

This application is a U.S. National Stage Filing under 35 U.S.C. 371 from International Application No. PCT/US2017/065710, filed Dec. 12, 2017 and published in English as WO 2018/111809 on Jun. 21, 2018, which claims the benefit of priority to International Application No. PCT/CN2016/109647, filed Dec. 13, 2016, which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to coordinated multi-point (CoMP) operation. Some embodiments relate to pre-coding and signaling of control information related to pre-coding. Some embodiments relate to carrier aggregation (CA).

BACKGROUND

Base stations and mobile devices operating in a cellular network may exchange data. Various techniques may be used to improve capacity and/or performance, in some cases, including communication in accordance with new radio (NR) techniques. In an example, a mobile device at a cell edge may communicate with multiple base stations. In another example, multiple channels may be used by a base station and/or mobile device in a carrier aggregation (CA) arrangement. Usage of such techniques may complicate some operations, such as communication of control information and/or others. Accordingly, there is a general need for methods and systems to perform such operations in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
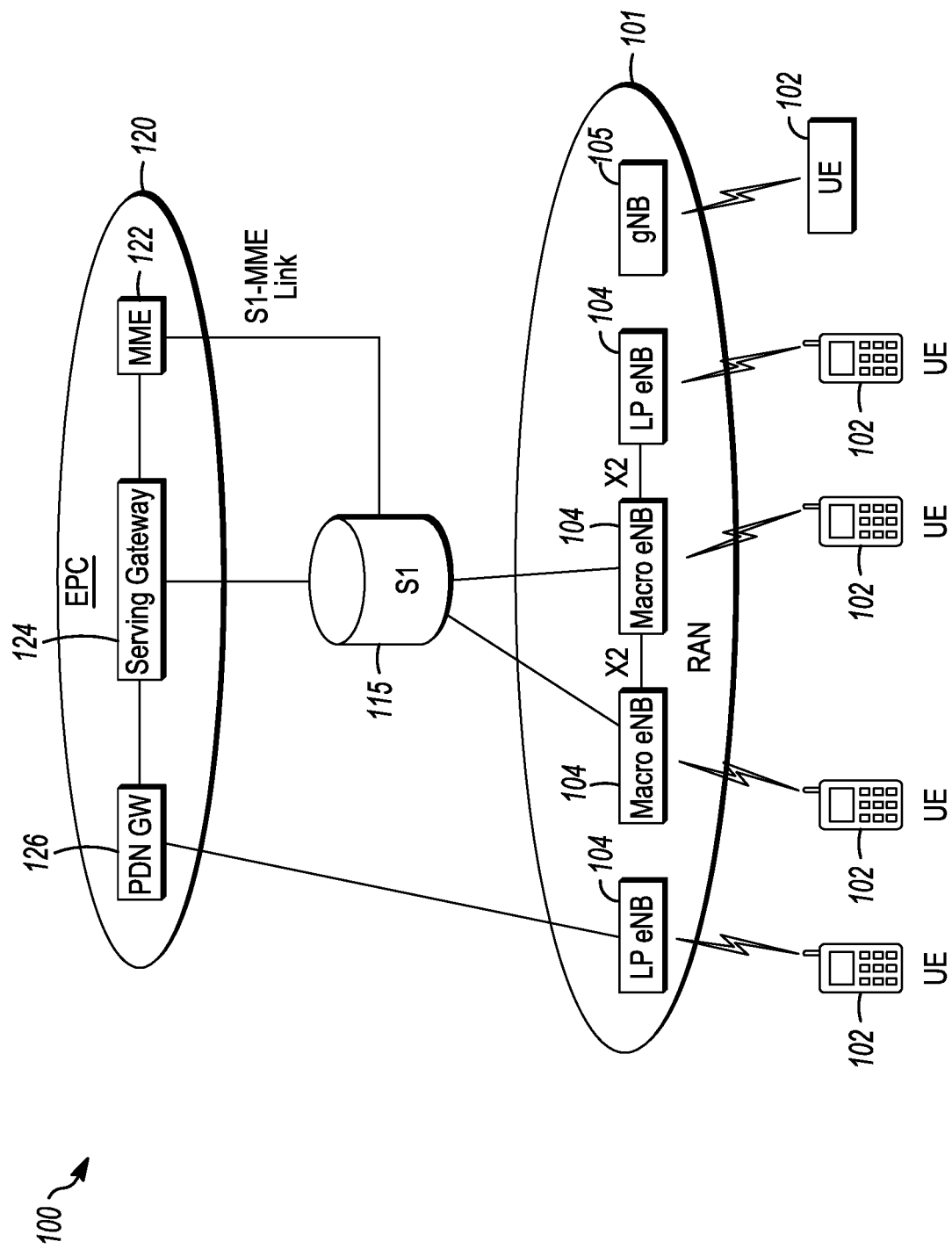
FIG. 1 is a functional diagram of an example network in accordance with some embodiments.

FIG. 1 is a functional diagram of an example network in accordance with some embodiments. In some embodiments, the network 100 may be a Third Generation Partnership Project (3GPP) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1. Some embodiments may not necessarily include all components shown in FIG. 1, and some embodiments may include additional components not shown in FIG. 1.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1 or to the number of gNBs 105 shown in FIG. 1. In some embodiments, the network 100 may not necessarily include eNBs 104. Embodiments are also not limited to the connectivity of components shown in FIG. 1.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by a gNB 105 are not limiting. In some embodiments, one or more of those operations, techniques and/or methods may be practiced by an eNB 104 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
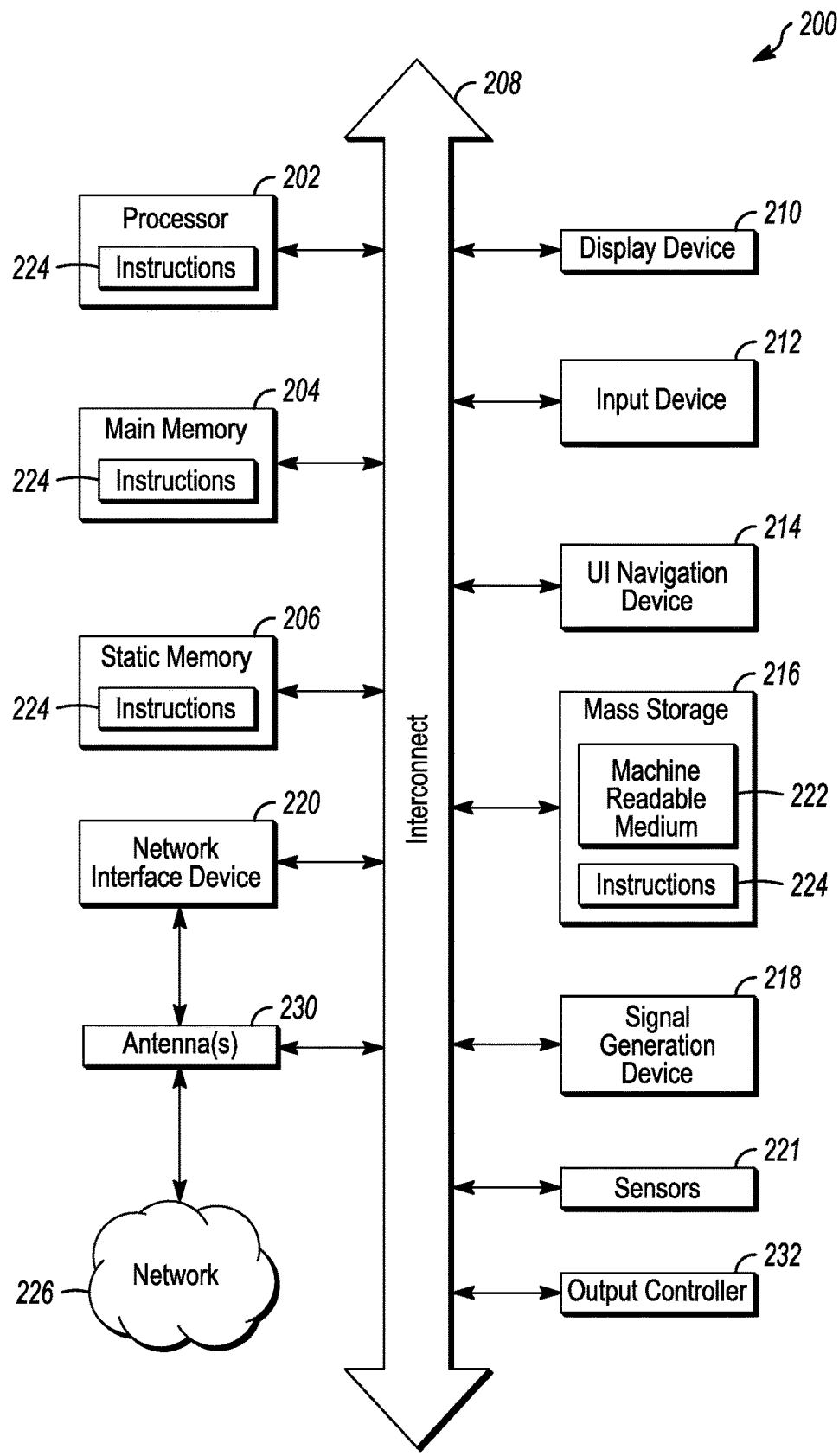
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), user, device, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
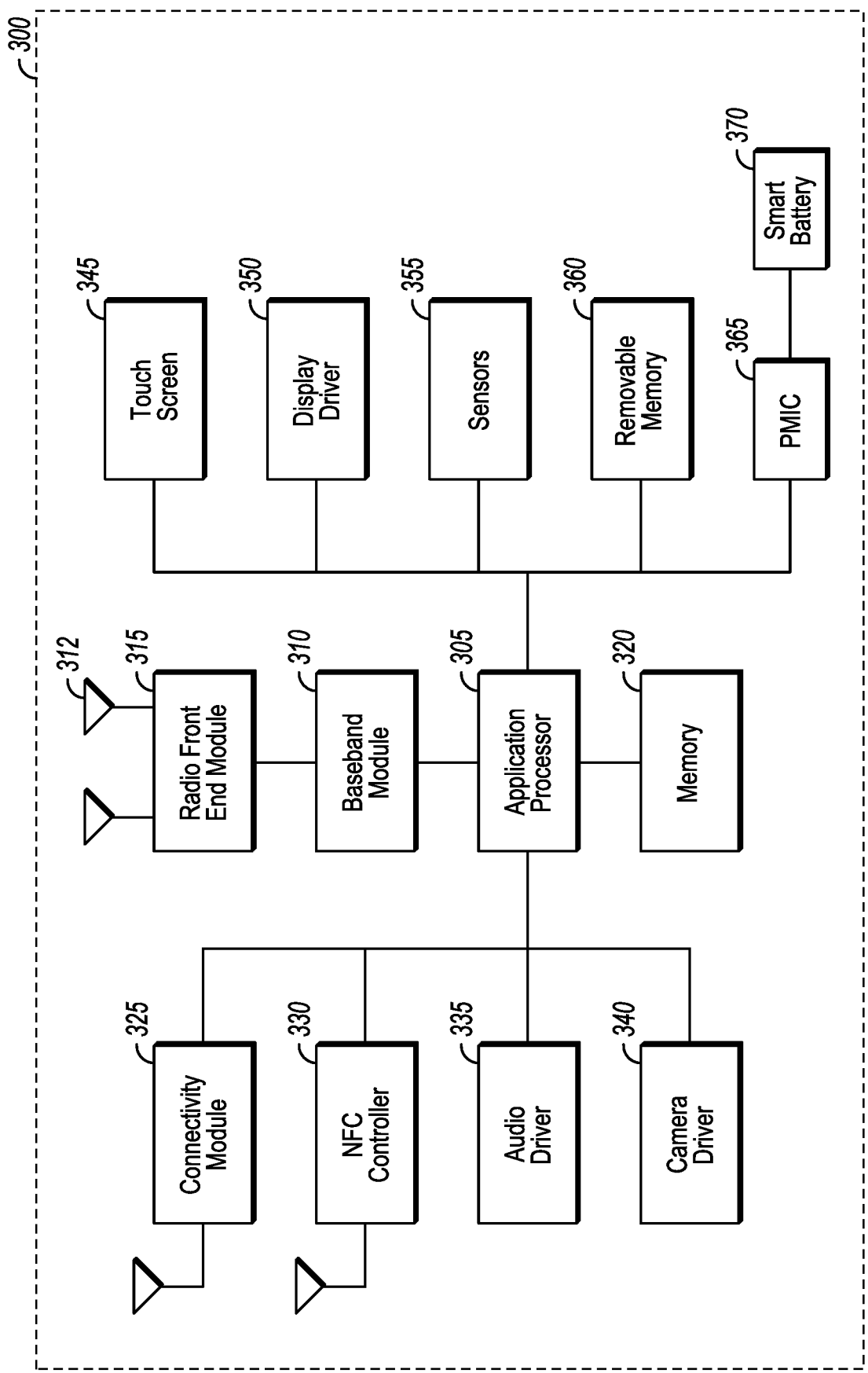
FIG. 3 illustrates a user device in accordance with some aspects.

FIG. 3 illustrates a user device in accordance with some aspects. In some embodiments, the user device 300 may be a mobile device. In some embodiments, the user device 300 may be or may be configured to operate as a User Equipment (UE). In some embodiments, the user device 300 may be arranged to operate in accordance with a new radio (NR) protocol. In some embodiments, the user device 300 may be arranged to operate in accordance with a Third Generation Partnership Protocol (3GPP) protocol. The user device 300 may be suitable for use as a UE 102 as depicted in FIG. 1, in some embodiments. It should be noted that in some embodiments, a UE, an apparatus of a UE, a user device or an apparatus of a user device may include one or more of the components shown in one or more of FIGS. 2, 3, and 5. In some embodiments, such a UE, user device and/or apparatus may include one or more additional components.

In some aspects, the user device 300 may include an application processor 305, baseband processor 310 (also referred to as a baseband module), radio front end module (RFEM) 315, memory 320, connectivity module 325, near field communication (NFC) controller 330, audio driver 335, camera driver 340, touch screen 345, display driver 350, sensors 355, removable memory 360, power management integrated circuit (PMIC) 365 and smart battery 370. In some aspects, the user device 300 may be a User Equipment (UE).

In some aspects, application processor 305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 310 may be implemented, for example, as a solder-down substrate including one or more integrated circuits, a single packaged integrated circuit soldered to a main circuit board, and/or a multi-chip module containing two or more integrated circuits.

Figure 4:
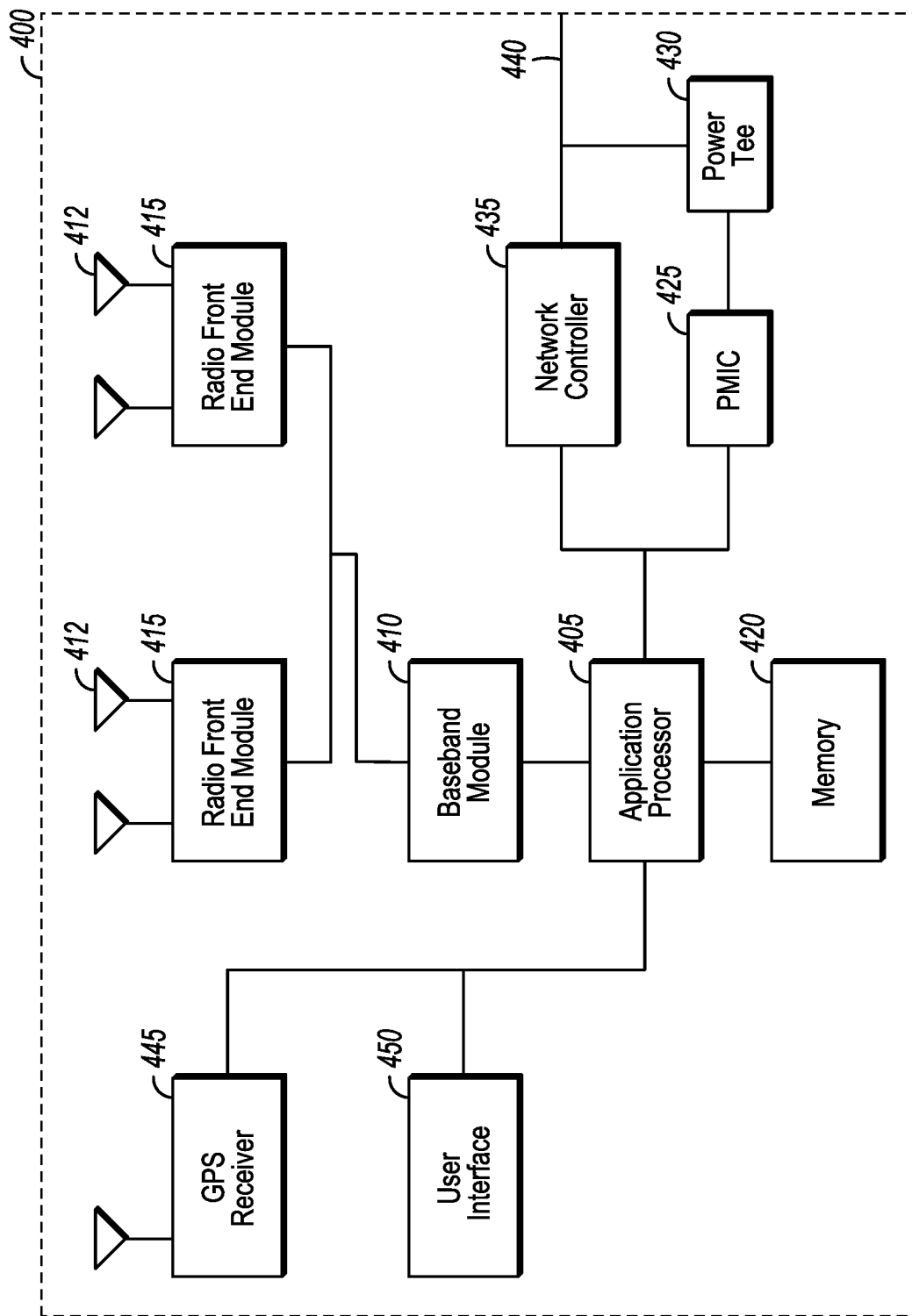
FIG. 4 illustrates a base station in accordance with some aspects.

FIG. 4 illustrates a base station in accordance with some aspects. In some embodiments, the base station 400 may be or may be configured to operate as an Evolved Node-B (eNB). In some embodiments, the base station 400 may be or may be configured to operate as a Generation Node-B (gNB). In some embodiments, the base station 400 may be arranged to operate in accordance with a new radio (NR) protocol. In some embodiments, the base station 400 may be arranged to operate in accordance with a Third Generation Partnership Protocol (3GPP) protocol. It should be noted that in some embodiments, the base station 400 may be a stationary non-mobile device. The base station 400 may be suitable for use as an eNB 104 as depicted in FIG. 1, in some embodiments. The base station 400 may be suitable for use as a gNB 105 as depicted in FIG. 1, in some embodiments. It should be noted that in some embodiments, an eNB, an apparatus of an eNB, a gNB, an apparatus of a gNB, a base station and/or an apparatus of a base station may include one or more of the components shown in one or more of FIGS. 2, 4, and 5. In some embodiments, such an eNB, gNB, base station and/or apparatus may include one or more additional components.

FIG. 4 illustrates a base station or infrastructure equipment radio head 400 in accordance with an aspect. The base station 400 may include one or more of application processor 405, baseband modules 410, one or more radio front end modules 415, memory 420, power management circuitry 425, power tee circuitry 430, network controller 435, network interface connector 440, satellite navigation receiver module 445, and user interface 450. In some aspects, the base station 400 may be an Evolved Node-B (eNB), which may be arranged to operate in accordance with a 3GPP protocol, new radio (NR) protocol and/or Fifth Generation (5G) protocol. In some aspects, the base station 400 may be a generation Node-B (gNB), which may be arranged to operate in accordance with a 3GPP protocol, new radio (NR) protocol and/or Fifth Generation (5G) protocol.

In some aspects, application processor 405 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 410 may be implemented, for example, as a solder-down substrate including one or more integrated circuits, a single packaged integrated circuit soldered to a main circuit board or a multi-chip module containing two or more integrated circuits.

In some aspects, memory 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto-resistive random access memory (MRAM) and/or a three-dimensional cross-point memory. Memory 420 may be implemented as one or more of solder down packaged integrated circuits, socketed memory modules and plug-in memory cards.

In some aspects, power management integrated circuitry 425 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 430 may provide for electrical power drawn from a network cable to provide both power supply and data connectivity to the base station 400 using a single cable. In some aspects, network controller 435 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 445 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 445 may provide data to application processor 405 which may include one or more of position data or time data. Application processor 405 may use time data to synchronize operations with other radio base stations. In some aspects, user interface 450 may include one or more of physical or virtual buttons, such as a reset button, one or more indicators such as light emitting diodes (LEDs) and a display screen.

Figure 5:
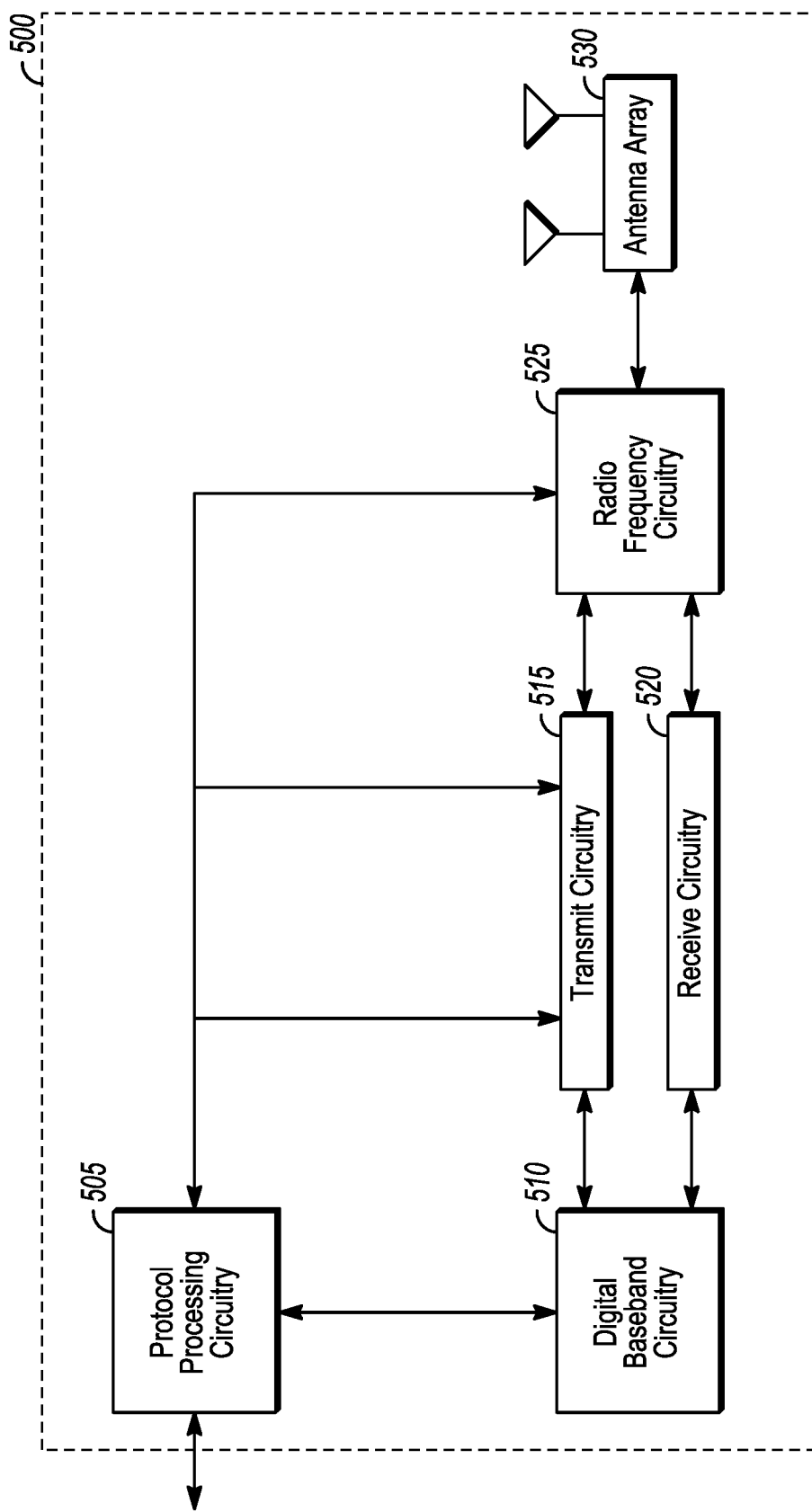
FIG. 5 illustrates an exemplary communication circuitry according to some aspects.

FIG. 5 illustrates an exemplary communication circuitry according to some aspects. Circuitry 500 is alternatively grouped according to functions. Components as shown in 500 are shown here for illustrative purposes and may include other components not shown here in FIG. 5. In some aspects, the communication circuitry 500 may be used for millimeter wave communication, although aspects are not limited to millimeter wave communication. Communication at any suitable frequency may be performed by the communication circuitry 500 in some aspects.

It should be noted that a device, such as a UE 102, eNB 104, gNB 105, the user device 300, the base station 400, the machine 200 and/or other device may include one or more components of the communication circuitry 500, in some aspects.

The communication circuitry 500 may include protocol processing circuitry 505, which may implement one or more of medium access control (MAC), radio link control (RLC), packet data convergence protocol (PDCP), radio resource control (RRC) and non-access stratum (NAS) functions. Protocol processing circuitry 505 may include one or more processing cores (not shown) to execute instructions and one or more memory structures (not shown) to store program and data information.

The communication circuitry 500 may further include digital baseband circuitry 510, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

The communication circuitry 500 may further include transmit circuitry 515, receive circuitry 520 and/or antenna array circuitry 530. The communication circuitry 500 may further include radio frequency (RF) circuitry 525. In an aspect of the disclosure, RF circuitry 525 may include multiple parallel RF chains for one or more of transmit or receive functions, each connected to one or more antennas of the antenna array 530.

In an aspect of the disclosure, protocol processing circuitry 505 may include one or more instances of control circuitry (not shown) to provide control functions for one or more of digital baseband circuitry 510, transmit circuitry 515, receive circuitry 520, and/or radio frequency circuitry 525

In some embodiments, processing circuitry may perform one or more operations described herein and/or other operation(s). In a non-limiting example, the processing circuitry may include one or more components such as the processor 202, application processor 305, baseband module 310, application processor 405, baseband module 410, protocol processing circuitry 505, digital baseband circuitry 510, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as the radio front end module 315, radio front end module 415, transmit circuitry 515, receive circuitry 520, radio frequency circuitry 525, similar component(s) and/or other component(s).

One or more antennas (such as 230, 312, 412, 530 and/or others) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas (such as 230, 312, 412, 530 and/or others) may be effectively separated to take advantage of spatial diversity and the different channel characteristics that may result.

In some embodiments, the UE 102, eNB 104, gNB 105, user device 300, base station 400, machine 200 and/or other device described herein may be a mobile device and/or portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 102, eNB 104, gNB 105, user device 300, base station 400, machine 200 and/or other device described herein may be configured to operate in accordance with 3GPP standards, although the scope of the embodiments is not limited in this respect. In some embodiments, the UE 102, eNB 104, gNB 105, user device 300, base station 400, machine 200 and/or other device described herein may be configured to operate in accordance with new radio (NR) standards, although the scope of the embodiments is not limited in this respect. In some embodiments, the UE 102, eNB 104, gNB 105, user device 300, base station 400, machine 200 and/or other device described herein may be configured to operate according to other protocols or standards, including IEEE 802.11 or other IEEE standards. In some embodiments, the UE 102, eNB 104, gNB 105, user device 300, base station 400, machine 200 and/or other device described herein may include one or more of a keyboard, a display, a non-volatile memory port, multiple antennas, a graphics processor, an application processor, speakers, and other mobile device elements. The display may be an LCD screen including a touch screen.

Although the UE 102, eNB 104, gNB 105, user device 300, base station 400, machine 200 and/or other device described herein may each be illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 102, eNB 104, gNB 105, machine 200, user device 300 and/or base station 400 may include various components shown in FIGS. 2-5. Accordingly, techniques and operations described herein that refer to the UE 102 may be applicable to an apparatus of a UE. In addition, techniques and operations described herein that refer to the eNB 104 may be applicable to an apparatus of an eNB. In addition, techniques and operations described herein that refer to the gNB 105 may be applicable to an apparatus of a gNB.

Figure 6:
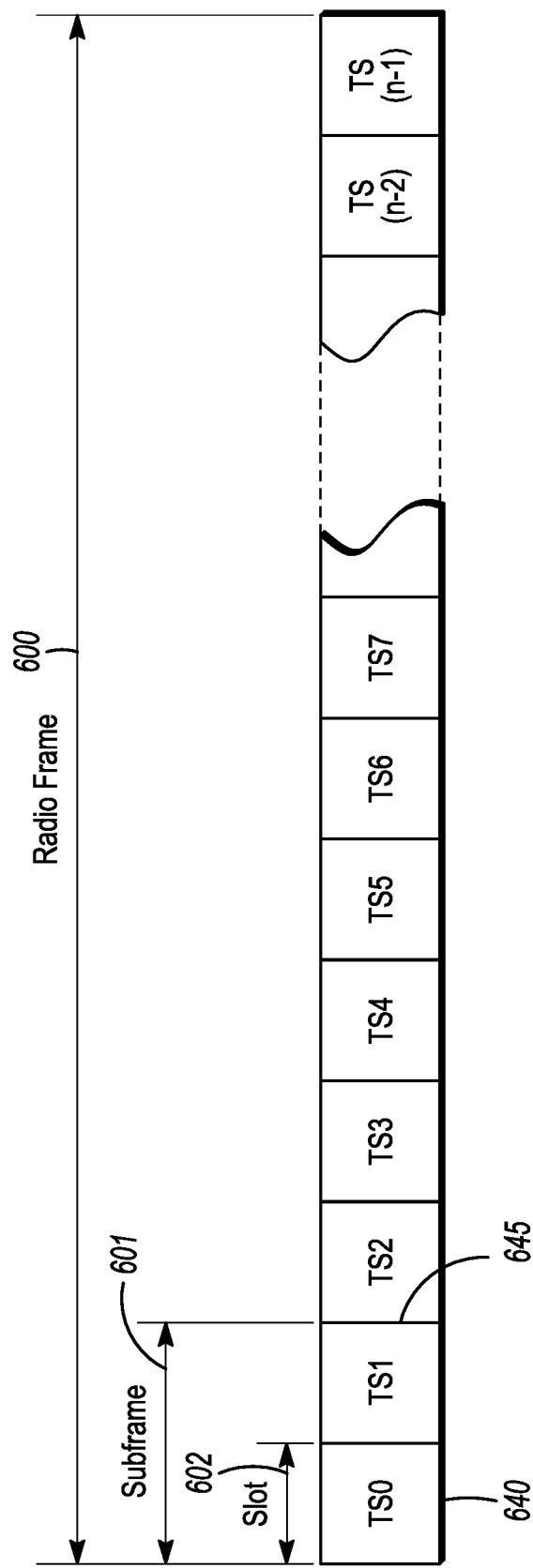
FIG. 6 illustrates an example radio frame structure in accordance with some embodiments.

FIG. 6 illustrates an example of a radio frame structure in accordance with some embodiments. FIG. 7 illustrates example frequency resources in accordance with some embodiments. It should be noted that the examples shown in FIGS. 6-7 may illustrate some or all of the concepts and techniques described herein in some cases, but embodiments are not limited by the examples. For instance, embodiments are not limited by the name, number, type, size, ordering, arrangement and/or other aspects of the time resources, symbol periods, frequency resources, PRBs and other elements as shown in FIGS. 6-7. Although some of the elements shown in the examples of FIGS. 6-7 may be included in a 3GPP LTE standard, 5G standard, NR standard and/or other standard, embodiments are not limited to usage of such elements that are included in standards.

An example of a radio frame structure that may be used in some aspects is shown in FIG. 6. In this example, radio frame 600 has a duration of 10 ms. Radio frame 600 is divided into slots 602 each of duration 0.5 ms, and numbered from 0 to 19. Additionally, each pair of adjacent slots 602 numbered 2i and 2i+1, where i is an integer, is referred to as a subframe 601.

In some aspects using the radio frame format of FIG. 6, each subframe 601 may include a combination of one or more of downlink control information, downlink data information, uplink control information and uplink data information. The combination of information types and direction may be selected independently for each subframe 602.

In some aspects, a sub-component of a transmitted signal consisting of one subcarrier in the frequency domain and one symbol interval in the time domain may be termed a resource element. Resource elements may be depicted in a grid form as shown in FIG. 7A and FIG. 7B.

Figure 7A:
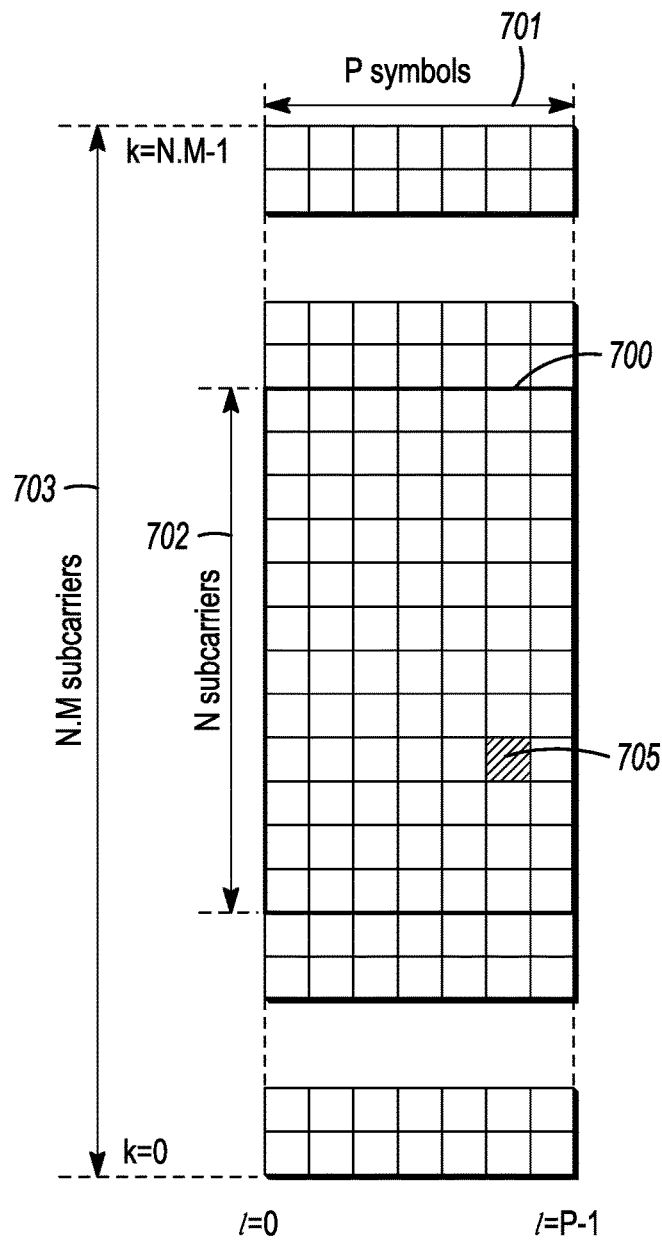
FIGS. 7A-7B illustrate example frequency resources in accordance with some embodiments.

In some aspects, illustrated in FIG. 7A, resource elements may be grouped into rectangular resource blocks 700 consisting of 12 subcarriers in the frequency domain and the P symbols in the time domain, where P may correspond to the number of symbols contained in one slot, and may be 6, 7, or any other suitable number of symbols.

Figure 7B:
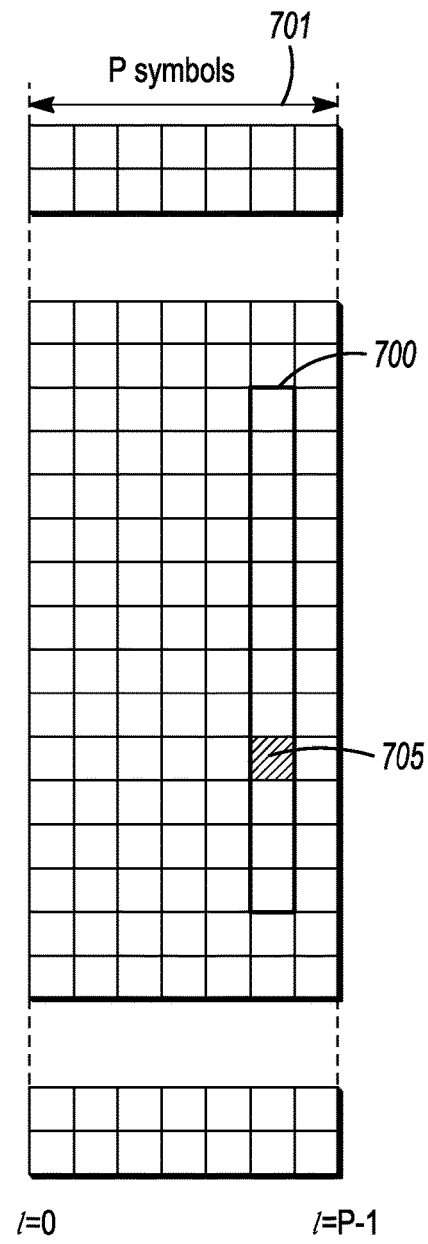

In some alternative aspects, illustrated in FIG. 7B, resource elements may be grouped into resource blocks 700 consisting of 12 subcarriers (as indicated by 702) in the frequency domain and one symbol in the time domain. In the depictions of FIG. 7A and FIG. 7B, each resource element 705 may be indexed as (k, l) where k is the index number of subcarrier, in the range 0 to N.M-1 (as indicated by 703), where N is the number of subcarriers in a resource block, and M is the number of resource blocks spanning a component carrier in the frequency domain.

In accordance with some embodiments, the UE 102 may receive from a generation Node-B (gNB) 105, control signaling that indicates: a first pre-coding matrix indicator (PMI) that indicates a first pre-coder for a first sub-band; and a second PMI that indicates a second pre-coder for a second sub-band. The first and second pre-coders may be included in predetermined candidate pre-coders. The UE 102 may encode a physical uplink shared channel (PUSCH) block for transmission. The UE 102 may scale the PUSCH block in the first sub-band by the first pre-coder. The UE 102 may scale the PUSCH block in the second sub-band by the second pre-coder. These embodiments are described in more detail below.

Figure 8:
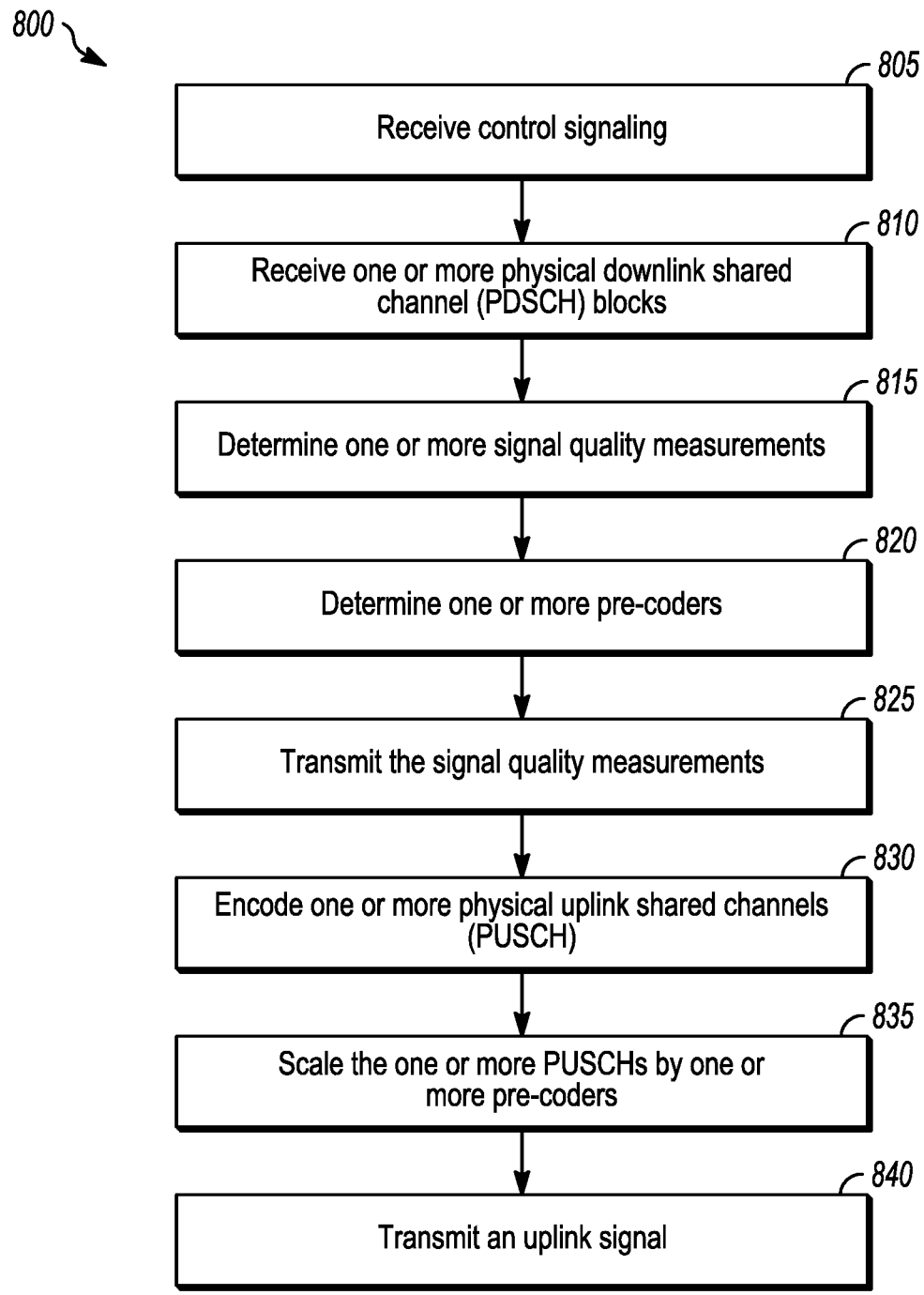
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In describing the method 800, reference may be made to FIGS. 1-7 and 9-12, although it is understood that the method 800 may be practiced with any other suitable systems, interfaces and components.

In some embodiments, a UE 102 may perform one or more operations of the method 800, but embodiments are not limited to performance of the method 800 and/or operations of it by the UE 102. In some embodiments, the eNB 104 and/or gNB 105 may perform one or more operations of the method 800 (and/or similar operations). Accordingly, although references may be made to performance of one or more operations of the method 800 by the UE 102 in descriptions herein, it is understood that the eNB 104 and/or gNB 105 may perform the same operation(s), similar operation(s) and/or reciprocal operation(s), in some embodiments.

In addition, while the method 800 and other methods described herein may refer to eNBs 104, gNBs 105 or UEs 102 operating in accordance with 3GPP standards, 5G standards and/or other standards, embodiments of those methods are not limited to just those eNBs 104, gNBs 105 or UEs 102 and may also be practiced on other devices, such as a Wi-Fi access point (AP) or user station (STA). In addition, the method 800 and other methods described herein may be practiced by wireless devices configured to operate in other suitable types of wireless communication systems, including systems configured to operate according to various IEEE standards such as IEEE 802.11. The method 800 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 800 and 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 805, the UE 102 may receive control signaling. In some embodiments, the UE 102 may receive the control signaling from the gNB 105, although the scope of embodiments is not limited in this respect. It should be noted that the gNB 105 may be referred to in some descriptions herein as a "server gNB" or a "serving gNB," but such references are not limiting. Such references may be used for clarity, in some cases. It should be noted that the gNB 105 may be referred to in some descriptions herein as an "assistant gNB" or an "assisting gNB," but such references are not limiting. Such references may be used for clarity, in some cases.

Examples of control signaling may include, but are not limited to downlink control information (DCI), uplink grant, medium access control (MAC) control element (CE) and radio resource control (RRC) signaling.

In a non-limiting example, the control signaling may indicate a first pre-coder for a first sub-band and a second pre-coder for a second sub-band. The first and second pre-coders may be included in predetermined candidate pre-coders. In some embodiments, the first and second sub-bands may be included in a carrier that comprises a plurality of sub-bands. For instance, the sub-bands of the plurality may be of a predetermined sub-band size and the sub-bands of the plurality are located at predetermined locations within the carrier.

In some embodiments, the control signaling may indicate one or more sub-band sizes. For instance, one or more sub-bands may be of variable size. In a non-limiting example, the control signaling may indicate a first size of the first sub-band and/or a second size of the second sub-band. In another non-limiting example, the control signaling may indicate a size of the first and second sub-bands.

Various technique(s) may be used to indicate the pre-coders. For instance, the control signaling may indicate: a first pre-coding matrix indicator (PMI) that indicates a first pre-coder for a first sub-band, and a second PMI that indicates a second pre-coder for a second sub-band. In some embodiments, the control signaling may indicate the pre-coders for usage by the UE 102, although the scope of embodiments is not limited in this respect.

It should be noted that embodiments are not limited to two pre-coders, as in the above example. Some or all examples, techniques and/or operations described herein for two pre-coders may be extended to any suitable number of pre-coders (including one pre-coder or more than two pre-coders). It should be noted that embodiments are not limited by numbers of elements included in descriptions herein. For instance, embodiments are not limited to usage of two pre-coders, two PMIs and/or two sub-bands, although some of the descriptions may refer to such cases. In some embodiments, the control signaling may be configurable to indicate any suitable number of PMIs. Any suitable number of pre-coders may be used. Any suitable number of sub-bands may be used. In a non-limiting example, a different pre-coder may be used for each sub-band, although the scope of embodiments is not limited to a one-to-one correspondence. In another non-limiting example, two or more of the sub-bands may use a same pre-coder, in some cases. In another non-limiting example, the UE 102 may be configurable to use different pre-coders in different sub-bands. In some embodiments, each pre-coder may correspond to a different PMI, although the scope of embodiments is not limited in this respect. In some embodiments, the control signaling may include more than two PMIs.

In some embodiments, the control signaling may indicate (using first and second PMIs and/or other technique(s)) first and second pre-coders for transmission of a PUSCH block to the server gNB 105 as part of a coordinated multi-point (CoMP) transmission. The control signaling may be configurable to further indicate additional PMIs that indicate additional pre-coders for transmission of the PUSCH block to an assistant gNB 105 as part of the CoMP transmission. Embodiments are not limited to transmission of a same PUSCH to the server gNB 105 and the assistant gNB 105. Different PUSCHs may be transmitted to each gNB 105, in some embodiments. Embodiments are also not limited to one assistant gNB 105, as multiple assistant gNBs 105 may be used, in some embodiments.

In some embodiments, the assistant gNB 105 may be included in candidate assistant gNBs 105. The control signaling may include an index that indicates the assistant gNB 105.

In some embodiments, the first and second sub-bands may be included in a first carrier. The first and second PMIs may indicate the first and second pre-coders for transmission of the PUSCH block in the first carrier in accordance with a carrier aggregation (CA) arrangement. The control signaling may be configurable to further indicate additional PMIs that indicate additional pre-coders for transmission in a second carrier in accordance with the CA arrangement. Embodiments are not limited to two carriers, as more than two carriers may be used in the CA arrangement, in some embodiments. Embodiments are not limited to usage of two sub-bands, as one or more of the techniques described herein may be extended to accommodate more than two sub-bands.

In some embodiments, the second carrier may be included in candidate carriers. The control signaling may include an index that indicates the second carrier.

In some embodiments, the control signaling may indicate first resource elements (REs) in which the server gNB 105 is to transmit first channel state information reference signals (CSI-RS) and may further indicate second REs in which an assistant gNB 105 is to transmit second CSI-RS. Embodiments are not limited to usage of two CSI-RS, as one or more of the techniques described herein may be extended to accommodate more than two CSI-RS.

In some embodiments, the control signaling may indicate, for an uplink coordinated multi-point (CoMP) transmission to the server gNB 105 and to an assistant gNB 105: a first PMI that indicates a first pre-coder for the server gNB 105, and a second PMI that indicates a second pre-coder for the assistant gNB 105. The first and second pre-coders may be included in a predetermined codebook of candidate pre-coders. In some embodiments, the assistant gNB 105 may be included in a plurality of candidate assistant gNBs 105. The control signaling may include an indicator of one or more of the assistant gNBs 105 that are included in the plurality of candidate assistant gNBs 105.

In some embodiments, the control signaling may include various information, including but not limited to information related to pre-coders, coordinated multi-point (CoMP) operation, carrier aggregation (CA), time resource(s), frequency resource(s), information related to assistant gNBs 105, information related to neighbor cells, information related to signal quality measurements, information related to transmission of elements (such as signals, CSI-RS, data, control information and/or other) by a gNB 105 (such as a server gNB 105, assistant gNB 105 and/or other), other information described herein and/or other information. It should be noted that embodiments are not limited to these examples of control messages, as other messages, which may or may not be included in a standard, may be used in some embodiments.

At operation 810, the UE 102 may receive one or more physical downlink shared channel (PDSCH) blocks. In some embodiments, the UE 102 may receive one or more PDSCH blocks from a gNB 105, although the scope of embodiments is not limited in this respect. In some embodiments, the UE 102 may receive one or more PDSCH blocks from a server gNB 105, although the scope of embodiments is not limited in this respect. In some embodiments, the UE 102 may receive one or more PDSCH blocks from an assistant gNB 105, although the scope of embodiments is not limited in this respect. It should be noted that embodiments are not limited to PDSCH blocks, as other types of downlink data elements (such as blocks, frames, messages and/or other) may be received by the UE 102, in some embodiments.

In some embodiments, control signaling may be associated with a PDSCH block received by the UE 102. In a non-limiting example, an orthogonal frequency division multiplexing (OFDM) signal received from the gNB 105 may include a physical downlink shared channel (PDSCH) multiplexed with the control signaling.

At operation 815, the UE 102 may determine one or more signal quality measurements. Example signal quality measurements may include, but are not limited to reference signal received power (RSRP), reference signal received quality (RSRQ), received signal power, signal-to-noise ratio (SNR) and/or other. In some embodiments, the signal quality measurements may be based on signals received from one or more gNBs 105 (such as the server gNB 105, assistant gNBs 105 and/or other). In some embodiments, the signal quality measurements may be based on signals received on one or more carriers (and/or channels). In some embodiments, the signal quality measurements may be based on reception in accordance with one or more pre-coders.

At operation 820, the UE 102 may determine one or more pre-coders. In some embodiments, the UE 102 may determine the one or more pre-coders for usage, by the UE 102, for uplink transmissions (examples of which are described herein). In some embodiments, the UE 102 may select one or more pre-coders from predetermined candidate pre-coders. In a non-limiting example, the UE 102 may select the one or more pre-coders based at least partly on the signal quality measurements. For instance, a plurality of signal quality measurements may be based on reception of a signal from the gNB 105 in accordance with a plurality of pre-coders, and the UE 102 may select the pre-coder that corresponds to a best signal quality measurement in the plurality of signal quality measurements. Embodiments are not limited to usage of two sub-bands, as one or more of the techniques described herein may be extended to accommodate more than two pre-coders.

In a non-limiting example, control signaling from the server gNB 105 may indicate first resource elements (REs) in which the server gNB 105 is to transmit first channel state information reference signals (CSI-RS) and may further indicate second REs in which an assistant gNB 105 is to transmit second CSI-RS. The UE 102 may determine first signal quality measurements based on reception of the first CSI-RS in accordance with predetermined candidate pre-coders. The UE 102 may determine second signal quality measurements based on reception of the second CSI-RS in accordance with the predetermined candidate pre-coders. For instance, the UE 102 may determine the first signal quality measurements based at least partly on correlations between the received first CSI-RS and the predetermined candidate pre-coders. The UE 102 may determine the second signal quality measurements based at least partly on correlations between the received second CSI-RS and the predetermined candidate pre-coders. Embodiments are not limited to usage of the correlations described above, as any suitable technique may be used to determine the signal quality measurements.

In the above example, the UE 102 may select, based on the first signal quality measurements, a first pre-coder from the predetermined candidate pre-coders for transmission to the server gNB 105. The UE 102 may select, based on the second signal quality measurements, a second pre-coder from the candidate pre-coders for transmission to the assistant gNB 105. Embodiments are not limited to usage of two pre-coders, as one or more of the techniques described herein may be extended to accommodate more than two sub-bands.

It should be noted that some embodiments may not necessarily include all operations shown in FIG. 8. For instance, in some embodiments, the UE 102 may not necessarily perform operation 820. For instance, control signaling from the gNB 105 (such as the server gNB 105) may indicate the pre-coders to be used by the UE 102.

At operation 825, the UE 102 may transmit the signal quality measurements. In some embodiments, the UE 102 may transmit the signal quality measurements to the server gNB 105, although the scope of embodiments is not limited in this respect. In a non-limiting example, the UE 102 may transmit the signal quality measurements to the server gNB 105, the server gNB 105 may determine (based at least partly on the signal quality measurements) one or more pre-coders to be used by the UE 102. Accordingly, in this example, the UE 102 may not necessarily determine the pre-coders, but may receive control signaling (which may be in addition to other received control signaling) that may indicate the pre-coders to be used by the UE 102. In this example and some other examples herein, the determined pre-coder(s) may be applicable to different sub-bands, different carriers and/or different gNBs 105, although the scope of embodiments is not limited in this respect.

At operation 830, the UE 102 may transmit one or more physical uplink shared channel (PUSCH) blocks. At operation 835, the UE 102 may scale the one or more PUSCH blocks by one or more pre-coders. At operation 840, the UE 102 may transmit an uplink signal. In some embodiments, the uplink signal may be based on one or more PUSCH blocks.

In some embodiments, the UE 102 may transmit one or more PUSCH blocks to one or more gNBs 105, although the scope of embodiments is not limited in this respect. In some embodiments, the UE 102 may transmit one or more PUSCH blocks to the server gNB 105, although the scope of embodiments is not limited in this respect. In some embodiments, the UE 102 may transmit one or more PUSCH blocks to an assistant gNB 105, although the scope of embodiments is not limited in this respect. It should be noted that embodiments are not limited to PUSCH blocks, as other types of uplink data elements (such as blocks, frames, messages and/or other) may be transmitted by the UE 102, in some embodiments.

In a non-limiting example, the UE 102 may scale the PUSCH block in the first sub-band by a first pre-coder and may scale the PUSCH block in the second sub-band by a second pre-coder. In some embodiments, the UE 102 may encode the PUSCH block for orthogonal frequency division multiplexing (OFDM) transmission, wherein symbols of the PUSCH block are mapped to resource elements (REs). The first and second sub-bands may comprise multiple REs. It should be noted that embodiments are not limited to usage of OFDM transmission. Embodiments are not limited to usage of two sub-bands, as one or more of the techniques described herein may be extended to accommodate more than two sub-bands. Embodiments are not limited to usage of two pre-coders, as one or more of the techniques described herein may be extended to accommodate more than two pre-coders.

In some embodiments, the UE 102 may encode a PUSCH block. The UE 102 may generate, for transmission, an uplink signal based on the PUSCH block scaled by a first pre-coder and further based on the PUSCH block scaled by a second pre-coder. In a non-limiting example, the UE 102 may scale the PUSCH block by the first pre-coder for transmission to the server gNB 105 and may scale the PUSCH block by the second pre-coder for transmission to the assistant gNB 105. In some cases, the uplink signal may be based on the PUSCH block scaled by the first pre-coder in a predetermined sub-band and may be further based on the PUSCH block scaled by the second pre-coder in the predetermined sub-band. It should be noted that embodiments are not limited to two gNBs 105, as the technique described above may be extended to more than two gNBs 105. Embodiments are not limited to usage of two pre-coders, as one or more of the techniques described herein may be extended to accommodate more than two pre-coders.

In some embodiments, the UE 102 may encode a PUSCH block. The UE 102 may generate, for an uplink CoMP transmission, an uplink signal based on the PUSCH block scaled by a first pre-coder (for the server gNB 105) and further based on the PUSCH block scaled by the second pre-coder (for the assistant gNB 105). It should be noted that embodiments are not limited to two gNBs 105, as the technique described above may be extended to more than two gNBs 105.

In some embodiments, an apparatus of a UE 102 may comprise memory. The memory may be configurable to store one or more PMIs. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to decoding of the control signaling. The apparatus of the UE 102 may include a transceiver to receive the control signaling. The transceiver may transmit and/or receive other blocks, messages and/or other elements.

Figure 9:
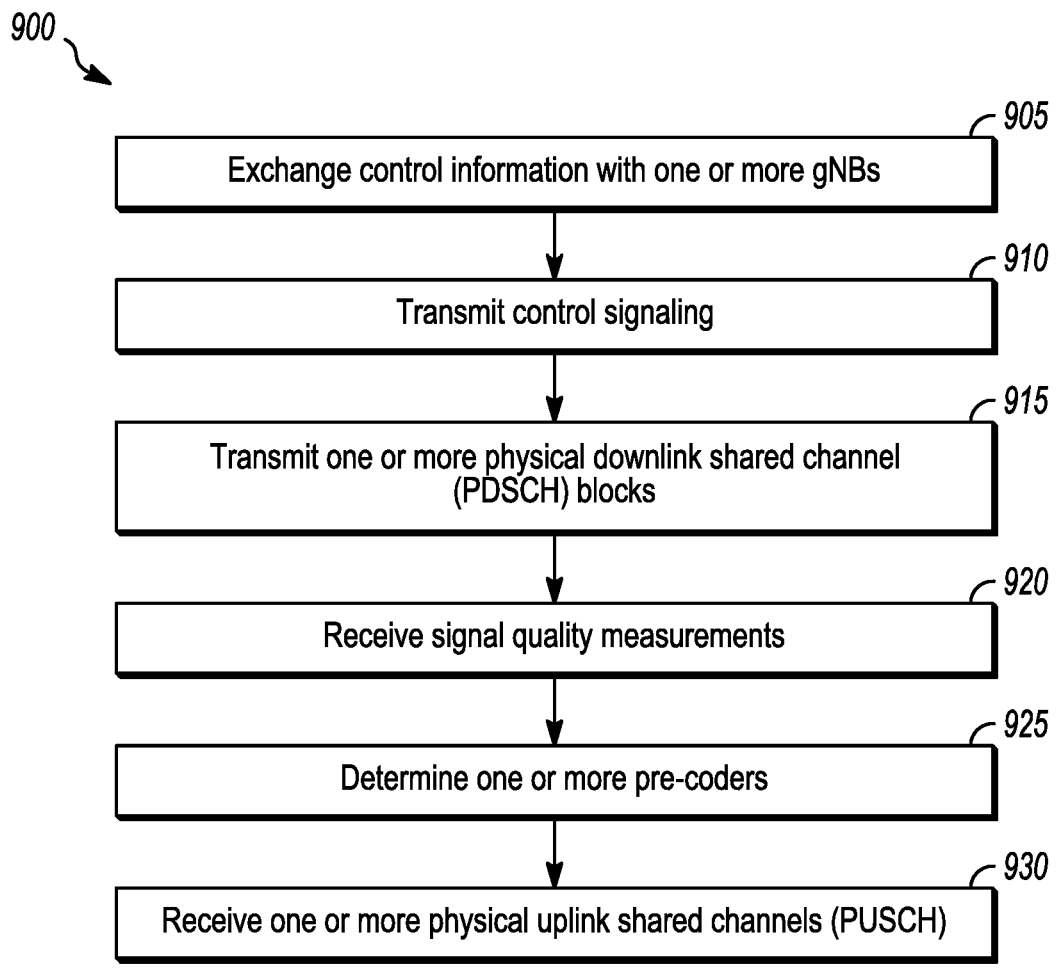
FIG. 9 illustrates the operation of another method of communication in accordance with some embodiments.

FIG. 9 illustrates the operation of another method of communication in accordance with some embodiments. Embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-12, although it is understood that the method 900 may be practiced with any other suitable systems, interfaces and components. In addition, embodiments of the method 900 may be applicable to UEs 102, eNBs 104, gNBs 105, APs, STAs and/or other wireless or mobile devices. The method 900 may also be applicable to an apparatus of a UE 102, eNB 104, gNB 105 and/or other device described above.

It should be noted that references to a gNB 105 (such as in descriptions of the method 800, descriptions of the method 900 and/or other descriptions) are not limiting. In some embodiments, an eNB 104 may perform one or more operations of the method 900. In some embodiments, an eNB 104 configured to operate as a gNB 105 may perform one or more operations of the method 900. In some embodiments, the gNB 105 may operate as a server gNB 105, a serving cell gNB 105 and/or similar, and may perform one or more operations (including but not limited to operations of the method 900), although the scope of embodiments is not limited in this respect.

In some embodiments, a gNB 105 may perform one or more operations of the method 900, but embodiments are not limited to performance of the method 900 and/or operations of it by the gNB 105. In some embodiments, the eNB 104 may perform one or more operations of the method 900 (and/or similar operations). In some embodiments, an eNB 104 may be configured to operate as a gNB 105 and may perform one or more operations of the method 900 (and/or similar operations). In some embodiments, the UE 102 may perform one or more operations of the method 900 (and/or similar operations). Accordingly, although references may be made to performance of one or more operations of the method 900 by the gNB 105 in descriptions herein, it is understood that the UE 102 may perform the same operation(s), similar operation(s) and/or reciprocal operation(s), in some embodiments.

It should be noted that the method 900 may be practiced by a gNB 105 and may include exchanging of elements, such as frames, signals, messages and/or other elements, with a UE 102. Similarly, the method 800 may be practiced by a UE 102 and may include exchanging of such elements with an gNB 105. In some cases, operations and techniques described as part of the method 800 may be relevant to the method 900. In addition, embodiments of the method 900 may include one or more operations performed by the gNB 105 that may be the same as, similar to or reciprocal to one or more operations described herein performed by the UE 102 (including but not limited to operations of the method 800). For instance, an operation of the method 800 may include reception of an element (such as a frame, block, message and/or other) by a UE 102 and the method 900 may include transmission of a same or similar element by the gNB 105.

In addition, previous discussion of various techniques and concepts may be applicable to the method 900 in some cases, including pre-coders, PMIs, control signaling, sub-bands, sub-band sizes, PUSCH, PDSCH, CoMP, CA arrangements, signal quality measurements and/or others. In addition, the examples shown in FIGS. 10-12 may also be applicable, in some cases, although the scope of embodiments is not limited in this respect.

At operation 905, the gNB 105 may exchange control information with one or more gNBs 105. In some embodiments, the gNB 105 may be a server gNB 105. In some embodiments, the gNB 105 may be configured to operate as a server gNB 105. In some embodiments, the gNB 105 may perform one or more operations of a server gNB 105. In some embodiments, the other gNBs 105 may be assistant gNBs 105. In some embodiments, the other gNBs 105 may be configured to operate as assistant gNBs 105. In some embodiments, the other gNBs 105 may perform one or more operations of an assistant gNB 105.

In some embodiments, the control information exchanged at operation 905 may be related to CoMP, CA and/or other techniques (including but not limited to techniques described herein), although the scope of embodiments is not limited in this respect. For instance, information related to predetermined pre-coders, PMIs, indexes of gNBs 105, indexes of carriers, signal quality measurements and/or other information may be exchanged.

At operation 910, the gNB 105 may transmit control signaling. In some embodiments, the gNB 105 may transmit the control signaling to the UE 102, although the scope of embodiments is not limited in this respect. In some embodiments, the control signaling may be similar to the control signaling described regarding the method 800, although the scope of embodiments is not limited in this respect.

At operation 915, the gNB 105 may transmit one or more PDSCH blocks. In some embodiments, the gNB 105 may transmit the one or more PDSCH blocks to the UE 102, although the scope of embodiments is not limited in this respect.

At operation 920, the gNB 105 may receive one or more signal quality measurements. In some embodiments, the gNB 105 may receive the one or more signal quality measurements from the UE 102, although the scope of embodiments is not limited in this respect.

At operation 925, the gNB 105 may determine one or more pre-coders. In some embodiments, the gNB 105 may determine the one or more pre-coders based at least partly on the signal quality measurements, although the scope of embodiments is not limited in this respect. The gNB 105 may determine the pre-coders for usage by the UE 102, although the scope of embodiments is not limited in this respect.

It should be noted that some embodiments may not necessarily include all operations shown in FIG. 9. For instance, some embodiments may not necessarily include operation 925.

At operation 930, the gNB 105 may receive one or more PUSCHs. In some embodiments, the gNB 105 may receive the one or more PUSCHs from the UE 102, although the scope of embodiments is not limited in this respect.

In some embodiments, the server gNB 105 may transmit control signaling that indicates pre-coders for a coordinated multi-point (CoMP) transmission by a UE 102 to a plurality of gNBs 105 that includes the server gNB 105 and one or more assistant gNBs 105. In some embodiments, the CoMP transmission may be in accordance with a carrier aggregation (CA) of a plurality of carriers, although embodiments are not limited to usage of multiple carriers.

Figure 11:
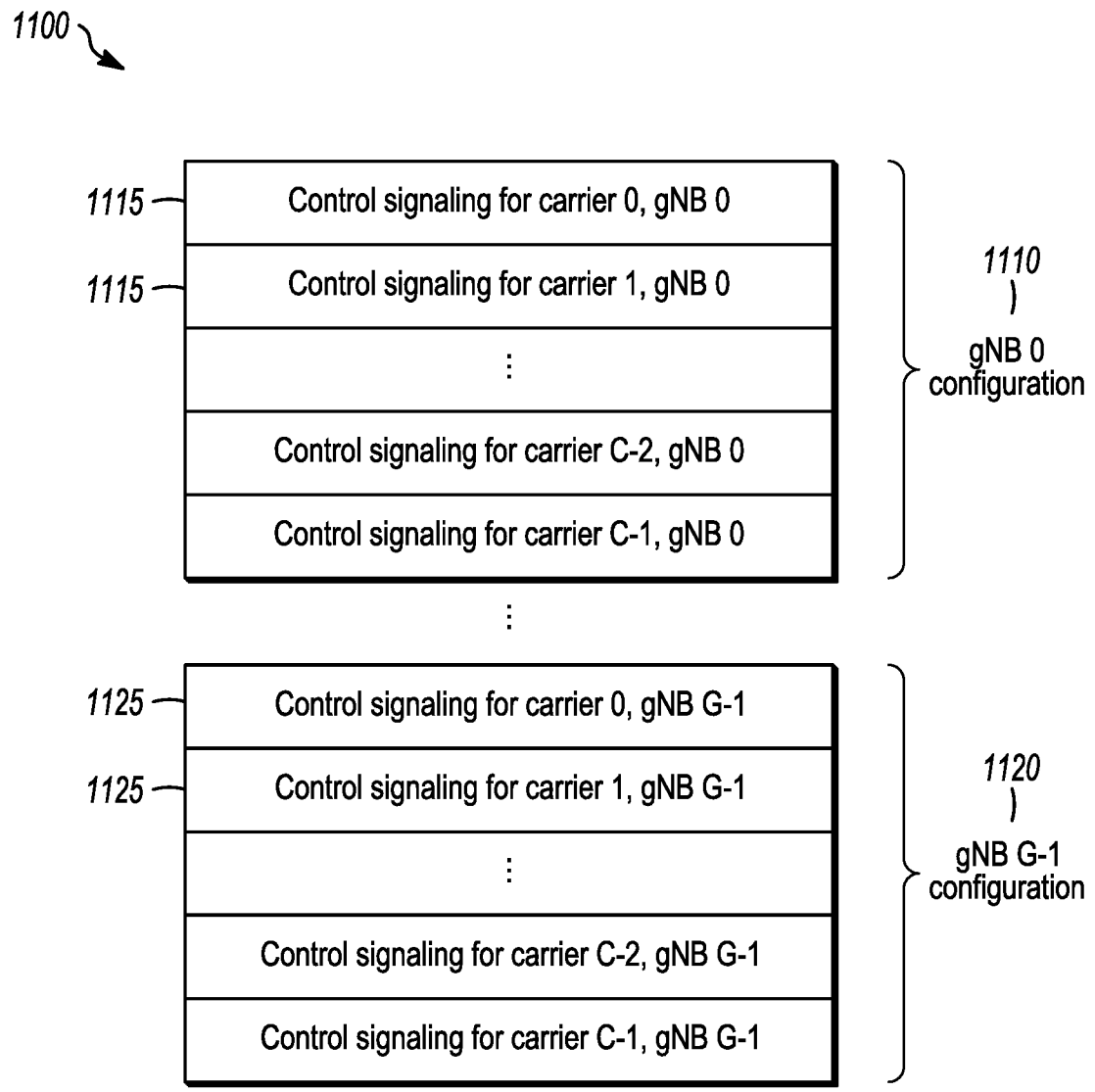
FIG. 11 illustrates example control signaling in accordance with some embodiments.

In a non-limiting example, the control signaling may include blocks of control signaling of any suitable size. The blocks may be arranged in accordance with a predetermined grid of a first and second dimension. The first dimension may be based on the plurality of gNBs 105 and the second dimension may be based on the plurality of carriers. An example grid is shown in FIG. 11 and will be described below. The server gNB 105 may receive one or more PUSCH blocks in accordance with the pre-coders of the control signaling that correspond to the server gNB 105. The PUSCH blocks may be received from the UE 102 in the plurality of carriers.

In some embodiments, the pre-coders may be included in predetermined candidate pre-coders. The gNB 105 may include PMIs to indicate the pre-coders in the control signaling. The PMIs may be mapped to the predetermined candidate pre-coders in accordance with a predetermined mapping.

In some embodiments, the gNB 105 may receive signal quality measurements from the UE 102. The signal quality measurements may be based on reception, at the UE 102, of channel state information reference signals (CSI-RS) from the plurality of gNBs 105 in the plurality of carriers in accordance with one or more of the candidate pre-coders. The gNB 105 may select at least some of the pre-coders indicated in the control signaling based on the signal quality measurements.

Figure 10:
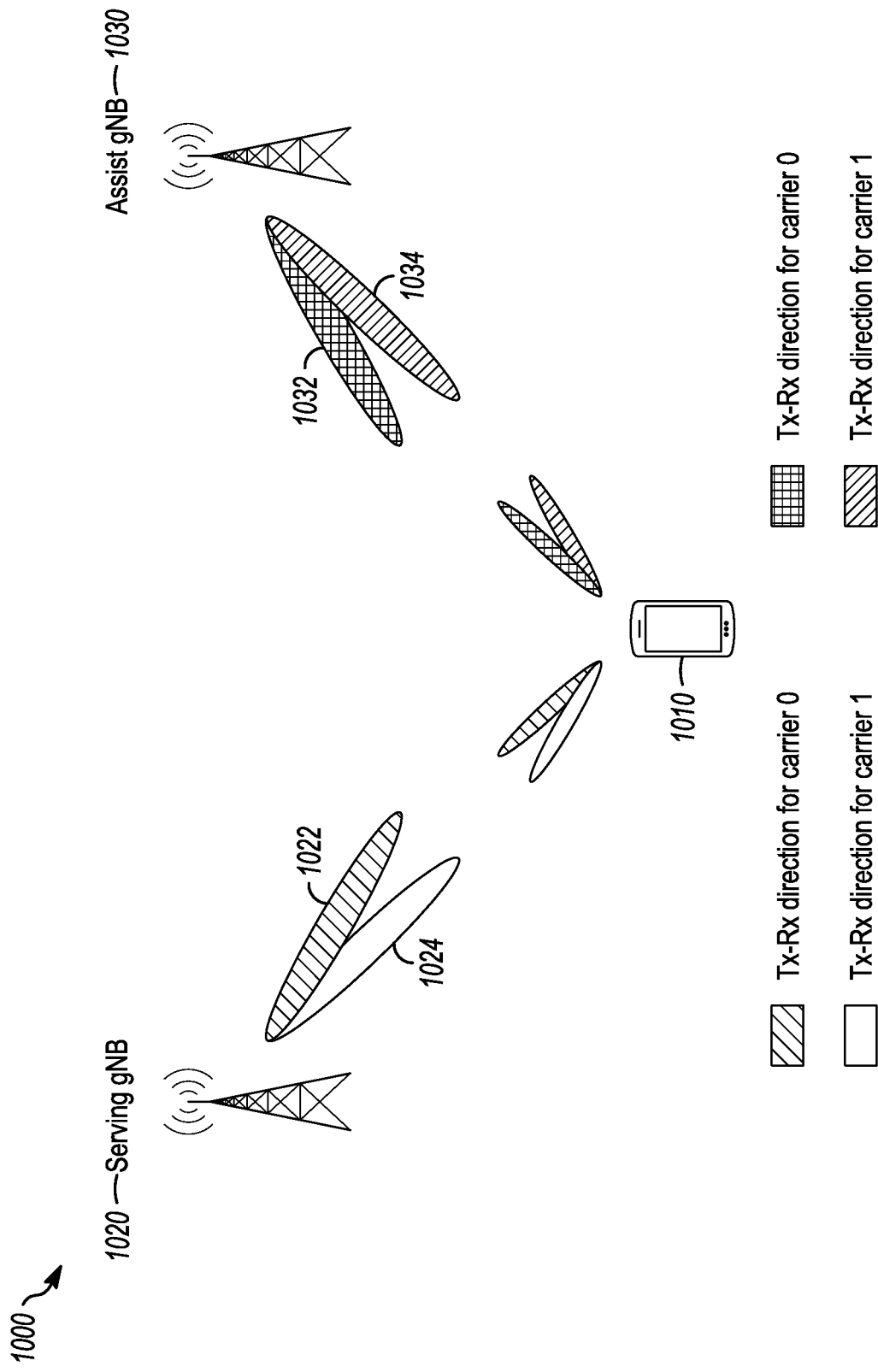
FIG. 10 illustrates an example of communication between a mobile device and one or more base stations in accordance with some embodiments.
Figure 12:
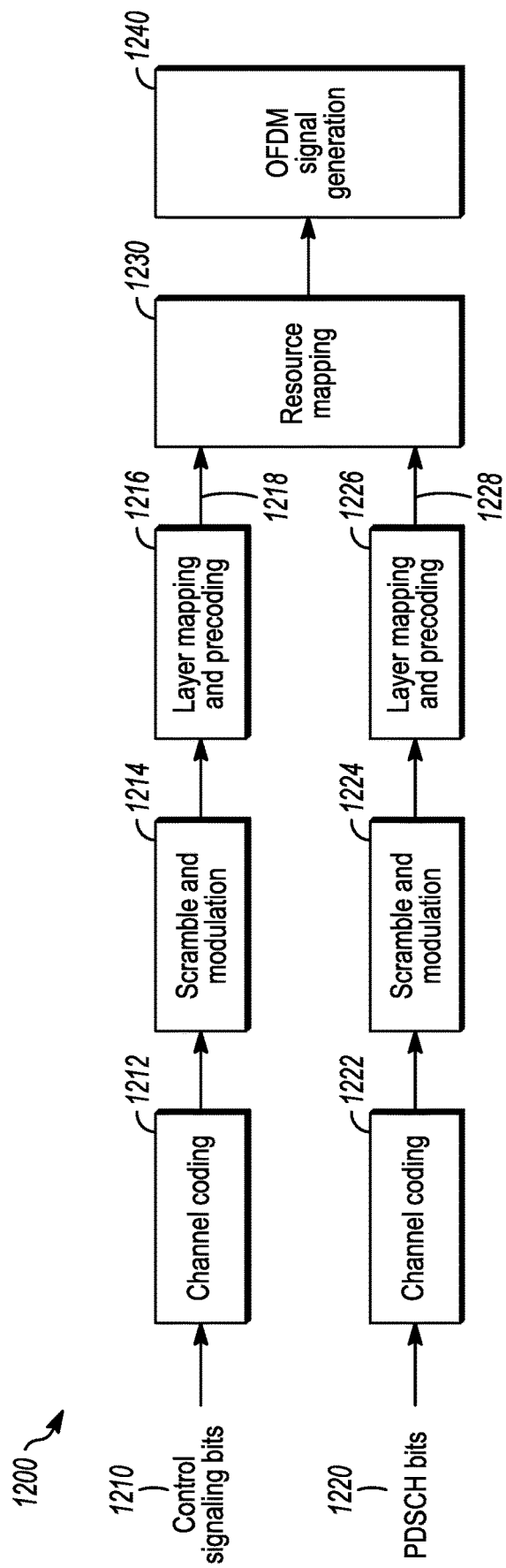
FIG. 12 illustrates example operations in accordance with some embodiments.

FIG. 10 illustrates examples of reference signals in accordance with some embodiments. FIG. 11 illustrates example operations in accordance with some embodiments. FIG. 12 illustrates examples of reference signal transmission in accordance with some embodiments. It should be noted that the examples shown in FIGS. 10-12 may illustrate some or all of the concepts and techniques described herein in some cases, but embodiments are not limited by the examples. For instance, embodiments are not limited by the name, number, type, size, ordering, arrangement and/or other aspects of the operations, time resources, symbol periods, frequency resources, subcarriers, REs, transmitted/received elements (such as reference signals, PSS, SSS and/or other), bandwidths and other elements as shown in FIGS. 10-12.

Although some of the elements shown in the examples of FIGS. 10-12 may be included in a 3GPP LTE standard, 5G standard, NR standard and/or other standard, embodiments are not limited to usage of such elements that are included in standards.

In some embodiments, a UE 102 may use uplink frequency selective precoding. For instance, the UE 102 may use different pre-coders for different sub-bands if the channel is frequency selective. In some embodiments, the gNB 105 may indicate which pre-coder from a pre-defined codebook is to be used by the UE 102 in each sub-band. In some cases, this operation may be performed as part of a codebook based technique, although the scope of embodiments is not limited in this respect. In some embodiments, the UE 102 may determine and/or estimate pre-coder(s) based on one a downlink channel. For instance, the UE 102 may determine and/or assume that uplink and downlink channels are reciprocal. In some cases, this operation may be performed as part of a reciprocity-based technique, although the scope of embodiments is not limited in this respect.

In some embodiments, one or more of the following may be indicated to the UE 102: one or more pre-coding matrix indicators (PMIs); one or more sub-band sizes; one or more target gNBs 105 to which the UE 102 is to transmit; one or more carrier indexes; whether uplink coordinated multi-point (CoMP) operation is supported; whether beam aggregation is supported; whether carrier aggregation (CA) is supported; and/or other information.

In some embodiments, a pre-coder of each sub-band may be indicated by the gNB 105. For instance, a PMI for each sub-band (frequency unit with the same pre-coder) may be indicated. In some embodiments, an indication of size(s) of the sub-band(s) may be indicated. This indication may enable the UE 102 UE to apply the pre-coder(s) to the proper physical resource(s), in some cases. In a non-limiting example, a size of each sub-band to be used by the UE 102 may be indicated, although the scope of embodiments is not limited in this respect.

In some embodiments, one or more receiving gNBs 105 (which may be referred to as target gNBs 105 in some cases) may be indicated to the UE 102. Such an indication may enable the UE 102 to apply the pre-coder(s) to the proper gNBs 105, in some cases. This operation may enable support of uplink CoMP and/or beam aggregation, in some cases.

In some embodiments, carrier aggregation (CA) may be supported. Uplink pre-coder(s) may be different for different carriers, in some cases. One or more carrier indexes may be indicated. In some embodiments, the carrier indexes may be associated with the PMIs.

Referring to FIG. 10, an example scenario 1000 is shown, in which different Tx-Rx direction may be used for different carriers and/or for different links (UE 102 to gNBs 105). The UE 1010 may transmit and/or receive signals from the server gNB 1020. The UE 1010 may transmit and/or receive signals from the assistant gNB 1030. Directional transmission may be used, in some cases. For instance, the directions 1022, 1024, 1032, 1034 may be used. Embodiments are not limited to two directions, however, as any suitable number of directions may be used. Embodiments are not limited to two gNBs (1020 and 1030 in this example), as any suitable number of gNBs may be used. In some embodiments, one or more pre-coding techniques may be used, including but not limited to those described herein. In some embodiments, scenarios such as 1000 and/or others may support coordinated multi-point (CoMP) technique(s) and/or carrier aggregation (CA) technique(s).

In some embodiments, control signaling may include one or more of the following: sub-band size(s), PMI(s) of one or more of the sub-bands, target receiving gNB 105 indexes of a set of candidate receiving gNBs 105 if cross-gNB pre-coder indication is enabled, carrier index if cross-carrier pre-coder indication is enabled and/or other information.

In some embodiments, the gNB 105 may indicate one or more sub-band sizes. This operation may mitigate issue(s) caused at least partly by rank reversal, in some cases. This operation may enable reduction of complexity at the UE 102, in some cases. In some embodiments, the UE 102 may indicate (such as to the gNB 105) a capability related to sub-band size, including but not limited to a minimal sub-band size that the UE 102 may support. To indicate the sub-band size, the control signaling may include one or more of the following: sub-band size(s), target receiving gNB 105 indexes (with respect to candidate receiving gNBs 105) if cross-gNB pre-coder indication is enabled, carrier index(es) if cross-carrier pre-coder indication is enabled and/or other information.

In some embodiments, each gNB 105 may transmit multiple CSI-RS resources, wherein each CSI-RS resource may be associated with different beam-forming at the gNB 105. In some cases, including but not limited to cases in which reciprocity is assumed and/or determined, the gNB 105 may indicate the index(es) of the CSI-RS resource(s) that are to be used to calculate the uplink pre-coding(s). In a non-limiting example, the gNB 105 may indicate the index(es) in an UL grant, although the scope of embodiments is not limited in this respect.

In some embodiments, whether the cross-gNB pre-coder indication is enabled may be pre-defined and/or configured by higher layer signaling. In some embodiments, whether the cross-carrier pre-coder indication is enabled may be pre-defined and/or configured by higher layer signaling.

In some embodiments, control signaling for multiple receiving gNBs 105 and/or multiple carriers may be transmitted together or independently. If the control signaling is transmitted together, the target receiving gNB 105 index and/or carrier index may not necessarily be transmitted. In a non-limiting example, in a scenario in which C carriers and G receiving gNBs 105 are available (and/or used), control signaling of each carrier and each gNB 105 may be generated in a predefined order. An example control signaling pattern is shown in FIG. 11. The block 1110 may include control information 1115 for gNB #0. In this example, the control information 1115 is ordered, within 1110, according to a carrier index 0, 1, . . . (C-1). A same or similar block may be included for each gNB. For instance, the block 1120 includes control information 1125 for another gNB (labeled as "G-1"). The pattern shown is an example pattern and is not limiting. Other predetermined arrangements are possible. In addition, it may be possible to use a format similar to the format shown in 1100 in cases in which a single carrier is used. In such cases, each block (1110, 1120 and/or others) may include control signaling for the single carrier. In some embodiments, the control signaling shown in 1100 may be the same or similar to control signaling described in embodiments and examples herein. The scope of embodiments is not limited in this respect, however.

In some embodiments, control signaling may include one or more of: Downlink Control Information (DCI), higher layer signaling and/or other. Higher layer signaling may include, but is not limited to, MAC Control Elements (CEs), RRC signaling and/or other.

In some embodiments, sub-band size(s) may be determined based on one or more factors, such as a system bandwidth and/or other. In some embodiments, the sub-band size(s) may be pre-defined.

In some embodiments, control signaling may be related to a Physical Downlink Shared Channel (PDSCH). In some embodiments, control signaling may be associated with a PDSCH. An example of control signaling transmission is shown in FIG. 12. In some embodiments, one or more of the operations shown may be used. In the example shown in FIG. 12, one or more of channel coding 1212, scramble and modulation 1214, layer mapping and precoding 1216 may be performed on control signaling bits 1210 to generate symbols 1218. One or more of channel coding 1222, scramble and modulation 1222, layer mapping and precoding 1226 may be performed on PDSCH bits 1220 (and/or other data bits) to generate symbols 1228. The symbols 1218 and/or 1228 may be input to a resource mapping operation 1230. OFDM signal generation may be performed as indicated by 1240.

In some embodiments, one or more additional operations may be used. In some embodiments, a same or different channel coding scheme and/or coding rate may be used for control signaling bits transmission in comparison to the PDSCH transmission. For instance, one or more of the following may be used for transmission of the control signaling bits: polar code, Low Density Parity Check Code (LDPC), Tailed Bit Convolutional Code and/or other. A same or different scrambling sequence may be used for control signaling bits transmission in comparison to the PDSCH transmission. A same or different modulation scheme may be used for control signaling bits transmission in comparison to the PDSCH transmission.

In a non-limiting example, QPSK may be used for control signaling transmission. In some cases, the modulation scheme for the control signaling transmission may be pre-defined by the system, although the scope of embodiments is not limited in this respect. In another non-limiting example, a same modulation scheme may be used for transmission of the control signaling bits and for the PDSCH transmission. A same pre-coder may be assigned for the transmission of the control signaling bits.

In some embodiments, for a PUSCH transmission in a fallback mode, the UE 102 may assume single antenna transmission even if the gNB 105 indicated the pre-coder for uplink transmission in PDSCH.

In some embodiments, control signaling may be transmitted via DCI or may be associated with PDSCH. This technique may be performed in order to reserve more PDCCH resource(s) for other DCI formats. If the PDSCH transmission is not performed, the control signaling for uplink sub-band precoding may be transmitted via DCI; otherwise it may be transmitted associated with PDSCH. Hence if the UE 102 receives the DCI to indicate the PDSCH transmission, the UE 102 may not necessarily assume that there could be the DCI for uplink sub-band precoding related precoding.

In some embodiments, the UE 102 may receive control signaling for uplink sub-band precoding. The UE 102 may determine, based at least partly on information included in the control signaling, uplink pre-coder(s) for the physical resources. The UE 102 may transmit an uplink signal to multiple gNBs 105 in multiple carriers. The UE 102 may transmit the uplink signal in accordance with the pre-coder(s), in some embodiments.

In some embodiments, the control signaling may include one or more of: one or more pre-coder matrix indexes (PMIs), one or more sub-band size(s), one or more target receiving gNB indexes (which may be from candidate receiving gNBs 105 in some embodiments), one or more carrier indexes (such as indexes for operation in a carrier aggregation mode). In a non-limiting example, the control signaling may include a PMI for each sub-band.

In some embodiments, the target receiving gNB index(es) may be transmitted in cases in which the cross gNB pre-coder indication is enabled. In some embodiments, the target receiving gNB index(es) may be pre-defined and/or configured via higher layer signaling.

In some embodiments, the carrier index(es) may be transmitted in cases in which the cross carrier pre-coder indication is enabled. In some embodiments, the carrier index(es) may be pre-defined and/or configured via higher layer signaling.

In some embodiments, the control signaling may be transmitted via Downlink Control Information (DCI), MAC Control Element(s) (CEs) and/or higher layer signaling.

In some embodiments, the control signaling may be associated with a PDSCH transmission.

In some embodiments, a polar code, Low Density Parity Check Code (LDPC), Tailed Bit Convolutional Code (TBCC) and/or other code may be utilized to encode the control signaling.

In some embodiments, QPSK may be used to modulate the control signaling bits. In some embodiments, a modulation scheme for the control signaling may be the same as a modulation scheme used for the PDSCH.

In some embodiments, a same pre-coder may be used for the control signaling and for a PDSCH. In some embodiments, a rank-1 pre-coder may be used. In some embodiments, if there is a PDSCH transmission, the control signaling may be transmitted associated with the PDSCH or with a MAC CE. Otherwise, the control signaling may be transmitted via DCI.

In some embodiments, indication of DL measurement RS for the UE 102 to calculate UL candidate pre-coders for pre-coded AP-SRS resource via DCI may be supported. In some embodiments, the DL measurement RS may be a CSI-RS. In some embodiments, the following mechanism for DCI signaling may be used: usage of a same field for AP-SRS resource triggering; and an association between triggering state, triggered SRS resource(s) and the CSI-RS resource ID may be higher layer configured.

In some embodiments, indication of DL measurement RS for the UE 102 to calculate UL candidate pre-coders for pre-coded P/SP-SRS resource via higher layer signaling may be supported. In some embodiments, the DL measurement RS may be a CSI-RS. In some embodiments, an AP-SRS(s) association with P(>1)-port AP-CSI-RS may be as follows: the AP-CSI-RS may be transmitted in the same slot as the DCI containing AP-SRS trigger; the AP-SRS(s) may be transmitted X symbols after the AP-CSI-RS. In some embodiments, AP/SP/P-SRS(s) may be associated with P(>1)-port P/SP-CSI-RS. In some embodiments, timing of UL pre-coder calculation based on the associated CSI-RS may be up to UE 102 implementation.

In some embodiments, "Scheme A" may refer to codebook-based UL transmission and "Scheme B" may refer to non-codebook based UL transmission. When a number of transmission ports is less than or equal to 2, frequency selective precoding may not necessarily be supported for both schemes A and B. When the number of transmission ports is >2, frequency selective precoding for CP-OFDM may be configured by gNB 105 for both schemes A and B.

In Example 1, an apparatus of a User Equipment (UE) may comprise memory. The apparatus may further comprise processing circuitry. The processing circuitry may be configured to decode, from a generation Node-B (gNB), control signaling that indicates: a first pre-coding matrix indicator (PMI) that indicates a first pre-coder for a first sub-band, and a second PMI that indicates a second pre-coder for a second sub-band. The first and second pre-coders may be included in predetermined candidate pre-coders. The processing circuitry may be further configured to store the first and second PMIs in the memory. The processing circuitry may be further configured to encode a physical uplink shared channel (PUSCH) block for transmission. The processing circuitry may be further configured to scale the PUSCH block in the first sub-band by the first pre-coder. The processing circuitry may be further configured to scale the PUSCH block in the second sub-band by the second pre-coder.

In Example 2, the subject matter of Example 1, wherein the processing circuitry may be further configured to map, to resources elements (REs) of the first sub-band for orthogonal frequency division multiplexing (OFDM) transmission, symbols of the PUSCH block scaled by the first pre-coder. The processing circuitry may be further configured to map, to REs of the second sub-band for OFDM transmission, symbols of the PUSCH block scaled by the second pre-coder.

In Example 3, the subject matter of one or any combination of Examples 1-2, wherein the control signaling may further indicate one or more sub-band sizes of the first and second sub-bands.

In Example 4, the subject matter of one or any combination of Examples 1-3, wherein the first and second sub-bands may be included in a carrier that comprises a plurality of sub-bands. The sub-bands of the plurality may be of a predetermined sub-band size. The sub-bands of the plurality may be located at predetermined locations within the carrier.

In Example 5, the subject matter of one or any combination of Examples 1-4, wherein the control signaling may be included in downlink control information (DCI), a medium access control (MAC) control element (CE) and/or radio resource control (RRC) signaling.

In Example 6, the subject matter of one or any combination of Examples 1-5, wherein the gNB may be a server gNB. The first and second PMIs may indicate the first and second pre-coders for transmission of the PUSCH block to the server gNB as part of a coordinated multi-point (CoMP) transmission. The control signaling may be configurable to further indicate additional PMIs that indicate additional pre-coders for transmission of the PUSCH block to an assistant gNB as part of the CoMP transmission.

In Example 7, the subject matter of one or any combination of Examples 1-6, wherein the assistant gNB may be included in candidate assistant gNBs. The control signaling may further include an index that indicates the assistant gNB.

In Example 8, the subject matter of one or any combination of Examples 1-7, wherein the first and second sub-bands may be included in a first carrier. The first and second PMIs may indicate the first and second pre-coders for transmission of the PUSCH block in the first carrier in accordance with a carrier aggregation (CA) arrangement. The control signaling may be configurable to further indicate additional PMIs that indicate additional pre-coders for transmission in a second carrier in accordance with the CA arrangement.

In Example 9, the subject matter of one or any combination of Examples 1-8, wherein the second carrier may be included in candidate carriers. The control signaling may further include an index that indicates the second carrier.

In Example 10, the subject matter of one or any combination of Examples 1-9, wherein the processing circuitry may be further configured to decode an orthogonal frequency division multiplexing (OFDM) signal from the gNB that includes a physical downlink shared channel (PDSCH) multiplexed with the control signaling.

In Example 11, the subject matter of one or any combination of Examples 1-10, wherein the control signaling may be configurable to include at least one additional PMI that indicates an additional pre-coder for an additional sub-band. The processing circuitry may be further configured to scale the PUSCH block in the additional sub-band by the additional pre-coder.

In Example 12, the subject matter of one or any combination of Examples 1-11, wherein the apparatus may further include a transceiver to receive the control signal and to transmit the PUSCH block.

In Example 13, the subject matter of one or any combination of Examples 1-12, wherein the processing circuitry may include a baseband processor to decode the control signaling and to encode the PUSCH block.

In Example 14, a computer-readable storage medium may store instructions for execution by one or more processors to perform operations for communication by a User Equipment (UE). The operations may configure the one or more processors to decode, from a server generation Node-B (gNB), control signaling that indicates first resource elements (REs) in which the server gNB is to transmit first channel state information reference signals (CSI-RS) and further indicates second REs in which an assistant gNB is to transmit second CSI-RS. The operations may further configure the one or more processors to determine first signal quality measurements based on reception of the first CSI-RS in accordance with predetermined candidate pre-coders. The operations may further configure the one or more processors to determine second signal quality measurements based on reception of the second CSI-RS in accordance with the predetermined candidate pre-coders. The operations may further configure the one or more processors to select, based on the first signal quality measurements, a first pre-coder from the predetermined candidate pre-coders for transmission to the server gNB. The operations may further configure the one or more processors to select, based on the second signal quality measurements, a second pre-coder from the candidate pre-coders for transmission to the assistant gNB.

In Example 15, the subject matter of Example 14, wherein the operations may further configure the one or more processors to encode a physical uplink shared channel (PUSCH) block. The operations may further configure the one or more processors to generate, for transmission, an uplink signal based on the PUSCH block scaled by the first pre-coder and further based on the PUSCH block scaled by the second pre-coder.

In Example 16, the subject matter of one or any combination of Examples 14-15, wherein the uplink signal may be based on the PUSCH block scaled by the first pre-coder in a predetermined sub-band and may be further based on the PUSCH block scaled by the second pre-coder in the predetermined sub-band.

In Example 17, the subject matter of one or any combination of Examples 14-16, wherein the operations may further configure the one or more processors to determine the first signal quality measurements based at least partly on correlations between the received first CSI-RS and the predetermined candidate pre-coders. The operations may further configure the one or more processors to determine the second signal quality measurements based at least partly on correlations between the received second CSI-RS and the predetermined candidate pre-coders.

In Example 18, an apparatus of a generation Node-B (gNB) may comprise memory. The gNB may be configurable to operate as a server gNB. The apparatus may further comprise processing circuitry. The processing circuitry may be configured to encode, for transmission, control signaling that indicates pre-coders for a coordinated multi-point (CoMP) transmission by a User Equipment (UE) to a plurality of gNBs that includes the server gNB and one or more assistant gNBs. The CoMP transmission may be in accordance with a carrier aggregation (CA) of a plurality of carriers. The control signaling may include blocks of control signaling. The blocks may be arranged in accordance with a predetermined grid of a first and second dimension. The first dimension may be based on the plurality of gNBs and the second dimension may be based on the plurality of carriers. The processing circuitry may be further configured to decode one or more physical uplink shared channel (PUSCH) blocks in accordance with the pre-coders of the control signaling that correspond to the server gNB. The PUSCH blocks may be received from the UE in the plurality of carriers. The memory may be configured to store at least a portion of the control signaling.

In Example 19, the subject matter of Example 18, wherein the pre-coders may be included in predetermined candidate pre-coders. The processing circuitry may be further configured to encode pre-coding matrix indicators (PMIs) to indicate the pre-coders in the control signaling. The PMIs may be mapped to the predetermined candidate pre-coders in accordance with a predetermined mapping.

In Example 20, the subject matter of one or any combination of Examples 18-19, wherein the processing circuitry may be further configured to decode signal quality measurements from the UE. The signal quality measurements may be based on reception, at the UE, of channel state information reference signals (CSI-RS) from the plurality of gNBs in the plurality of carriers in accordance with one or more of the candidate pre-coders. The processing circuitry may be further configured to select at least some of the pre-coders indicated in the control signaling based on the signal quality measurements.

In Example 21, an apparatus of a User Equipment (UE) may comprise memory. The apparatus may further comprise processing circuitry. The processing circuitry may be configured to decode control signaling from a server generation Node-B (gNB), wherein the control signaling indicates, for an uplink coordinated multi-point (CoMP) transmission to the server gNB and to an assistant gNB: a first pre-coder matrix indicator (PMI) that indicates a first pre-coder for the server gNB, and a second PMI that indicates a second pre-coder for the assistant gNB. The first and second pre-coders may be included in a predetermined codebook of candidate pre-coders. The processing circuitry may be further configured to encode a physical uplink shared channel (PUSCH) block. The processing circuitry may be further configured to generate, for the uplink CoMP transmission, an uplink signal based on the PUSCH block scaled by the first pre-coder and further based on the PUSCH block scaled by the second pre-coder. The memory may be configured to store the PUSCH block.

In Example 22, the subject matter of Example 21, wherein the assistant gNB may be included in a plurality of candidate assistant gNBs. The control signaling may further include an indicator of the assistant gNB, the assistant gNB included in the plurality of candidate assistant gNBs.

In Example 23, an apparatus of a User Equipment (UE) may comprise means for decoding, from a server generation Node-B (gNB), control signaling that indicates first resource elements (REs) in which the server gNB is to transmit first channel state information reference signals (CSI-RS) and further indicates second REs in which an assistant gNB is to transmit second CSI-RS. The apparatus may further comprise means for determining first signal quality measurements based on reception of the first CSI-RS in accordance with predetermined candidate pre-coders. The apparatus may further comprise means for determining second signal quality measurements based on reception of the second CSI-RS in accordance with the predetermined candidate pre-coders. The apparatus may further comprise means for selecting, based on the first signal quality measurements, a first pre-coder from the predetermined candidate pre-coders for transmission to the server gNB. The apparatus may further comprise means for selecting, based on the second signal quality measurements, a second pre-coder from the candidate pre-coders for transmission to the assistant gNB.

In Example 24, the subject matter of Example 23, wherein the apparatus may further comprise means for encoding a physical uplink shared channel (PUSCH) block. The apparatus may further comprise means for generating, for transmission, an uplink signal based on the PUSCH block scaled by the first pre-coder and further based on the PUSCH block scaled by the second pre-coder.

In Example 25, the subject matter of one or any combination of Examples 23-24, wherein the uplink signal may be based on the PUSCH block scaled by the first pre-coder in a predetermined sub-band and may be further based on the PUSCH block scaled by the second pre-coder in the predetermined sub-band.

In Example 26, the subject matter of one or any combination of Examples 23-25, wherein the apparatus may further comprise means for determining the first signal quality measurements based at least partly on correlations between the received first CSI-RS and the predetermined candidate pre-coders. The apparatus may further comprise means for determining the second signal quality measurements based at least partly on correlations between the received second CSI-RS and the predetermined candidate pre-coders.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:
1. An apparatus, comprising:
memory; and
processing circuitry, configured to:
  decode, from a base station, control signaling that indicates:
    a first pre-coding matrix indicator (PMI) that indicates a first pre-coder for a first sub-band,
    a second PMI that indicates a second pre-coder for a second sub-band, and
    additional PMIs that indicate additional pre-coders for transmission in a second carrier in accordance with a carrier aggregation (CA) arrangement, wherein the first and second pre-coders are included in predetermined candidate pre-coders, wherein the first and second sub-bands are included in a first carrier, and wherein the first and second PMIs indicate the first and second pre-coders for transmission of a physical uplink shared channel (PUSCH) block in the first carrier in accordance with the CA arrangement;
store the first and second PMIs in the memory;
encode a physical uplink shared channel (PUSCH) block for transmission;
scale the PUSCH block in the first sub-band by the first pre-coder; and
scale the PUSCH block in the second sub-band by the second pre-coder.

2. The apparatus according to claim 1, the processing circuitry further configured to:
map, to resources elements (REs) of the first sub-band for orthogonal frequency division multiplexing (OFDM) transmission, symbols of the PUSCH block scaled by the first pre-coder; and
map, to REs of the second sub-band for OFDM transmission, symbols of the PUSCH block scaled by the second pre-coder.

3. The apparatus according to claim 1, wherein the control signaling further indicates one or more sub-band sizes of the first and second sub-bands.

4. The apparatus according to claim 1, wherein:
the first and second sub-bands are included in a carrier that comprises a plurality of sub-bands,
the sub-bands of the plurality are of a predetermined sub-band size, and
the sub-bands of the plurality are located at predetermined locations within the carrier.

5. The apparatus according to claim 1, wherein the control signaling is included in downlink control information (DCI), a medium access control (MAC) control element (CE) and/or radio resource control (RRC) signaling.

6. The apparatus according to claim 1, wherein:
the base station is a server base station,
the first and second PMIs indicate the first and second pre-coders for transmission of the PUSCH block to the server base station as part of a coordinated multi-point (CoMP) transmission, and
the control signaling is configurable to further indicate additional PMIs that indicate additional pre-coders for transmission of the PUSCH block to an assistant base station as part of the CoMP transmission.

7. The apparatus according to claim 6, wherein:
the assistant base station is included in candidate assistant base stations, and
the control signaling further includes an index that indicates the assistant base station.

8. The apparatus according to claim 1, wherein:
the second carrier is included in candidate carriers, and
the control signaling further includes an index that indicates the second carrier.

9. The apparatus according to claim 1, the processing circuitry further configured to:
decode an orthogonal frequency division multiplexing (OFDM) signal from the base station that includes a physical downlink shared channel (PDSCH) multiplexed with the control signaling.

10. The apparatus according to claim 1, wherein:
the control signaling is configurable to include at least one additional PMI that indicates an additional pre-coder for an additional sub-band, and
the processing circuitry is further configured to scale the PUSCH block in the additional sub-band by the additional pre-coder.

11. The apparatus according to claim 1, wherein the apparatus further includes a transceiver to receive the control signal and to transmit the PUSCH block.

12. The apparatus according to claim 1, wherein the processing circuitry includes a baseband processor to decode the control signaling and to encode the PUSCH block.

13. A non-transitory computer-readable storage medium that stores instructions executable by one or more processors to cause a User Equipment (UE) to:
decode, from a base station, control signaling that indicates:
a first pre-coding matrix indicator (PMI) that indicates a first pre-coder for a first sub-band,
a second PMI that indicates a second pre-coder for a second sub-band,
additional PMIs that indicate additional pre-coders for transmission in a second carrier in accordance with a carrier aggregation (CA) arrangement,
wherein the first and second pre-coders are included in predetermined candidate pre-coders, wherein the first and second sub-bands are included in a first carrier, and wherein the first and second PMIs indicate the first and second pre-coders for transmission of a physical uplink shared channel (PUSCH) block in the first carrier in accordance with the CA arrangement;
store the first and second PMIs in memory;
encode a physical uplink shared channel (PUSCH) block for transmission;
scale the PUSCH block in the first sub-band by the first pre-coder; and
scale the PUSCH block in the second sub-band by the second pre-coder.

14. The non-transitory computer-readable storage medium according to claim 13,
wherein the instructions are further executable by one or more processors to cause the UE to:
map, to resources elements (REs) of the first sub-band for orthogonal frequency division multiplexing (OFDM) transmission, symbols of the PUSCH block scaled by the first pre-coder; and
map, to REs of the second sub-band for OFDM transmission, symbols of the PUSCH block scaled by the second pre-coder.

15. The non-transitory computer-readable storage medium according to claim 13,
wherein the control signaling further indicates one or more sub-band sizes of the first and second sub-bands.

16. The non-transitory computer-readable storage medium according to claim 13,
wherein the first and second sub-bands are included in a carrier that comprises a plurality of sub-bands;
wherein the sub-bands of the plurality are of a predetermined sub-band size; and wherein the sub-bands of the plurality are located at predetermined locations within the carrier.

17. The non-transitory computer-readable storage medium according to claim 13,
wherein the control signaling is included in downlink control information (DCI), a medium access control (MAC) control element (CE) and/or radio resource control (RRC) signaling.

18. A User Equipment (UE), comprising:
at least one antenna;
at least one radio, wherein the at least one radio is configured to perform cellular communication;
one or more processors coupled to the at least one radio, wherein the one or more processors and the at least one radio are configured to perform voice and/or data communications;
wherein the one or more processors are configured to cause the UE to:
  decode, from a base station, control signaling that indicates:
    a first pre-coding matrix indicator (PMI) that indicates a first pre-coder for a first sub-band, and
    a second PMI that indicates a second pre-coder for a second sub-band,
    additional PMIs that indicate additional pre-coders for transmission in a second carrier in accordance with a carrier aggregation (CA) arrangement,
    wherein the first and second pre-coders are included in predetermined candidate pre-coders, wherein the first and second sub-bands are included in a first carrier, and wherein the first and second PMIs indicate the first and second pre-coders for transmission of a physical uplink shared channel (PUSCH) block in the first carrier in accordance with the CA arrangement;
  store the first and second PMIs in memory;
  encode a physical uplink shared channel (PUSCH) block for transmission;
  scale the PUSCH block in the first sub-band by the first pre-coder; and
  scale the PUSCH block in the second sub-band by the second pre-coder.

19. The UE according to claim 18,
wherein the base station is a server base station;
wherein the first and second PMIs indicate the first and second pre-coders for transmission of the PUSCH block to the server base station as part of a coordinated multi-point (CoMP) transmission; and
wherein the control signaling is configurable to further indicate additional PMIs that indicate additional pre-coders for transmission of the PUSCH block to an assistant base station as part of the CoMP transmission.

20. The UE according to claim 19,
wherein the assistant base station is included in candidate assistant base station, and
wherein the control signaling further includes an index that indicates the assistant base station.

21. The UE according to claim 18,
wherein the second carrier is included in candidate carriers, and
wherein the control signaling further includes an index that indicates the second carrier.

22. The non-transitory computer-readable storage medium according to claim 13,
wherein the second carrier is included in candidate carriers, and
wherein the control signaling further includes an index that indicates the second carrier.

* * * * *